US010605292B2

(12) United States Patent
Herre et al.

(10) Patent No.: US 10,605,292 B2
(45) Date of Patent: *Mar. 31, 2020

(54) COATING AGENT DEVICE AND COATING DEVICE

(71) Applicant: Dürr Systems AG, Bietigheim-Bissingen (DE)

(72) Inventors: Frank Herre, Oberriexingen (DE); Joachim Hering, Duermentingen (DE); Rainer Melcher, Oberstenfeld (DE); Thomas Buck, Sachsenheim (DE); Michael Baumann, Flein (DE); Bernhard Seiz, Lauffen (DE); Manfred Michelfelder, Steinheim (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 175 days.

This patent is subject to a terminal disclaimer.

(21) Appl. No.: 15/809,000

(22) Filed: Nov. 10, 2017

(65) Prior Publication Data
US 2018/0065138 A1 Mar. 8, 2018

Related U.S. Application Data

(60) Division of application No. 15/351,583, filed on Nov. 15, 2016, now Pat. No. 9,839,933, which is a (Continued)

(30) Foreign Application Priority Data

May 6, 2009 (DE) .................. 10 2009 020 077

(51) Int. Cl.
*F16B 35/00* (2006.01)
*B05B 12/14* (2006.01)
(Continued)

(52) U.S. Cl.
CPC .......... *F16B 35/007* (2013.01); *B05B 12/149* (2013.01); *B05C 5/0225* (2013.01);
(Continued)

(58) Field of Classification Search
CPC ..... B05B 12/14; B05B 12/149; B05C 5/0225; F16B 7/18; F16B 7/20; F16B 35/007; F16B 2200/10
See application file for complete search history.

(56) References Cited

U.S. PATENT DOCUMENTS 2,296,079 A 9/1942 Anderson
3,922,009 A 11/1975 Giebeler
(Continued)

FOREIGN PATENT DOCUMENTS

CN 2086341 U 10/1991
CN 2123647 U 12/1992
(Continued)

OTHER PUBLICATIONS

EP Office Action for Application No. 16002115.0 dated Feb. 1, 2019 (5 pages).
(Continued)

*Primary Examiner* — Darren W Gorman
(74) *Attorney, Agent, or Firm* — Bejin Bieneman PLC

(57) ABSTRACT

Various exemplary illustrations of a coating agent device are disclosed. In one example, a coating agent device may be a coating agent valve, e.g., for influencing the discharge of a coating agent. The coating agent device may include a plug-in or pluggable fastening base configured to facilitate a plug-in or pluggable mounting of the coating agent device. In some examples, the coating agent device may prevent relative rotation of the device relative to a mating component.

7 Claims, 24 Drawing Sheets

Related U.S. Application Data continuation of application No. 13/319,241, filed as application No. PCT/EP2010/002760 on May 5, 2010, now Pat. No. 9,528,539.

(51) Int. Cl.
  *F16B 7/18* (2006.01)
  *F16B 7/20* (2006.01)
  *B05C 5/02* (2006.01)

(52) U.S. Cl.
  CPC .................. *F16B 7/18* (2013.01); *F16B 7/20* (2013.01); *B05B 12/14* (2013.01)

(56) References Cited

U.S. PATENT DOCUMENTS

| | | | |
|---|---|---|---|
| 4,163,523 A * | 8/1979 | Vincent | B05B 12/14 137/454.5 |
| 4,422,576 A * | 12/1983 | Saito | B05B 5/04 239/693 |
| 4,846,226 A | 7/1989 | Merritt | |
| 4,953,756 A | 9/1990 | Breault et al. | |
| 5,146,950 A * | 9/1992 | Rodgers | B05B 12/149 137/563 |
| 5,338,581 A | 8/1994 | Delot | |
| 5,487,507 A | 1/1996 | McDonald | |
| 6,128,511 A | 10/2000 | Irie | |
| 6,315,168 B1 | 11/2001 | Bolyard, Jr. | |
| 6,619,563 B2 * | 9/2003 | van der Steur | B05B 12/149 239/124 |
| 6,983,860 B2 | 1/2006 | Arnaboldi et al. | |
| 7,097,121 B2 * | 8/2006 | Giulano | B05B 12/149 137/565.01 |
| 7,560,137 B2 | 7/2009 | Zoppas et al. | |
| 8,044,361 B2 | 10/2011 | Ukita | |
| 2003/0234299 A1 | 12/2003 | Hosoda et al. | |
| 2003/0234300 A1 | 12/2003 | Dianna | |
| 2004/0074545 A1 * | 4/2004 | Rodrigues | F16K 27/003 137/883 |
| 2004/0250759 A1 | 12/2004 | Ueno | |
| 2006/0038154 A1 | 2/2006 | Fukano et al. | |
| 2006/0124672 A1 | 6/2006 | Penalver Garcia | |
| 2008/0110939 A1 | 5/2008 | Frates | |

FOREIGN PATENT DOCUMENTS

| | | |
|---|---|---|
| CN | 1112859 A | 12/1995 |
| CN | 2325579 Y | 6/1999 |
| CN | 2612830 Y | 4/2004 |
| CN | 2835682 Y | 11/2006 |
| CN | 101042202 A | 9/2007 |
| CN | 1734140 A | 2/2008 |
| CN | 201227179 Y | 4/2009 |
| DE | 3246446 A1 | 8/1983 |
| DE | 3512967 A1 | 10/1986 |
| DE | 19516697 A1 | 11/1996 |
| DE | 19914343 A1 | 10/2000 |
| DE | 202006010422 U1 | 8/2006 |
| EP | 0167499 A2 | 1/1986 |
| EP | 0642842 A2 | 3/1995 |
| EP | 1157747 A2 | 11/2001 |
| EP | 1308217 A2 | 5/2003 |
| GB | 2274495 A | 7/1994 |
| JP | S51-031359 A | 3/1976 |
| JP | S53-093563 U | 7/1978 |
| JP | S5541824 A | 3/1980 |
| JP | S58-42040 Y2 | 9/1983 |
| JP | S61-024809 A | 2/1986 |
| JP | S63167235 A | 7/1988 |
| JP | H01-074134 U | 5/1989 |
| JP | H02-86666 | 7/1990 |
| JP | H03-114559 A | 5/1991 |
| JP | H04-127409 U | 11/1992 |
| JP | H05-7354 U | 2/1993 |
| JP | H07-194998 A | 8/1995 |
| JP | H08-010661 A | 1/1996 |
| JP | 3038884 U | 6/1997 |
| JP | H09-217668 A | 8/1997 |
| JP | H09-314014 A | 12/1997 |
| JP | 2704681 | 1/1998 |
| JP | 3056080 U | 2/1999 |
| JP | H11117929 A | 4/1999 |
| JP | 2002-039414 A | 2/2002 |
| JP | 2015-156716 A | 8/2002 |
| JP | 2003117447 A | 4/2003 |
| JP | 2003211036 A1 | 11/2003 |
| JP | 2004-516937 A | 6/2004 |
| JP | 2005-349387 | 12/2005 |
| JP | 07-155667 A | 6/2007 |
| JP | 2008-119554 A | 5/2008 |
| JP | 2008142657 A | 6/2008 |
| JP | 2008208983 A | 9/2008 |
| RU | 2098196 C1 | 12/1997 |
| RU | 2157736 C2 | 10/2000 |
| RU | 2323787 C2 | 5/2008 |
| WO | 9946057 A1 | 9/1999 |
| WO | 02100553 A1 | 12/2002 |
| WO | 2008060935 A2 | 5/2008 |

OTHER PUBLICATIONS

Notification of Reasons for Rejection from the JPO on JP Application No. 2015-156716 dated Sep. 6, 2016 (with English translation; 11 pages).

Notification of Reasons for Rejection from the JPO on JP Application No. 2012-508946 dated May 7, 2014 (with English translation; 8 pages).

International Search Report and Written Opinion for PCT/EP2010/002760 dated Nov. 18, 2010 (with English translations; 35 pages).

Japanese Office Action for JP2015-156716 dated Aug. 29, 2017 (18 pages).

CIPO Third Office Action for Chinese Patent Application No. 201611052137.7 dated Oct. 14, 2019 ( 7 pages).

CIPO Second Office Action for Chinese Patent Application No. 201611052136.2 dated Oct. 8, 2019 (1 page; with English translation of Search Report).

* cited by examiner

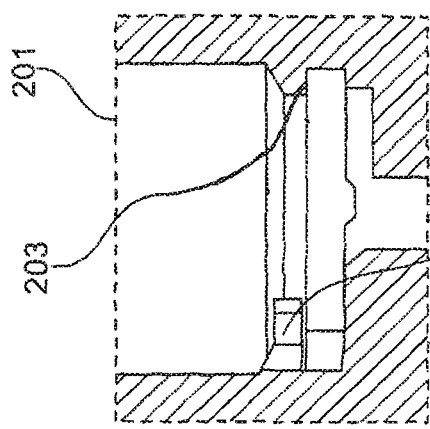
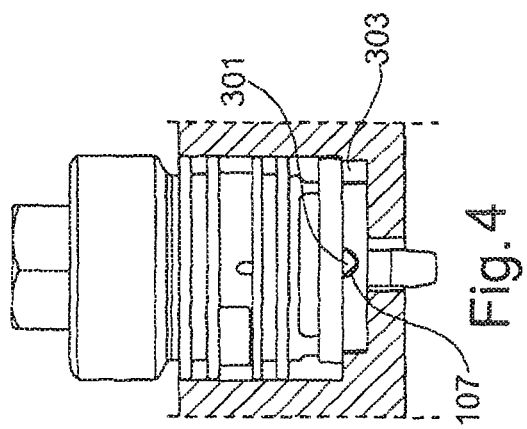
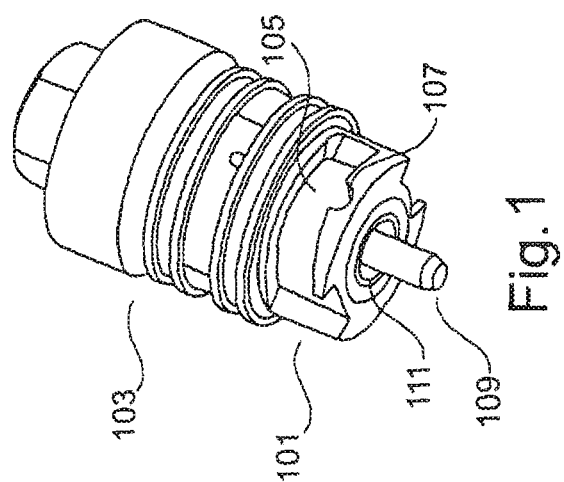
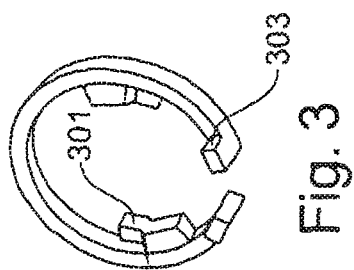

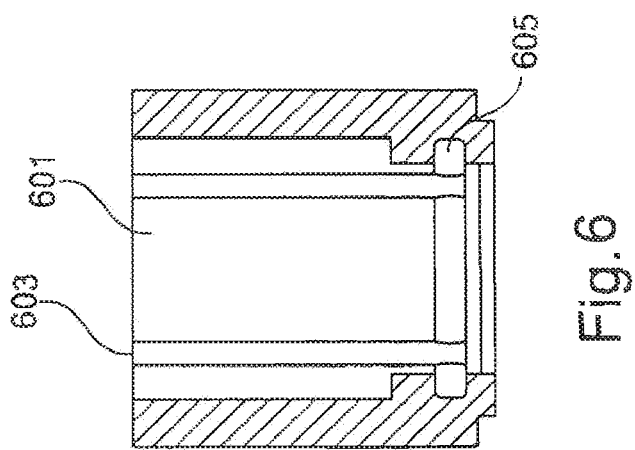
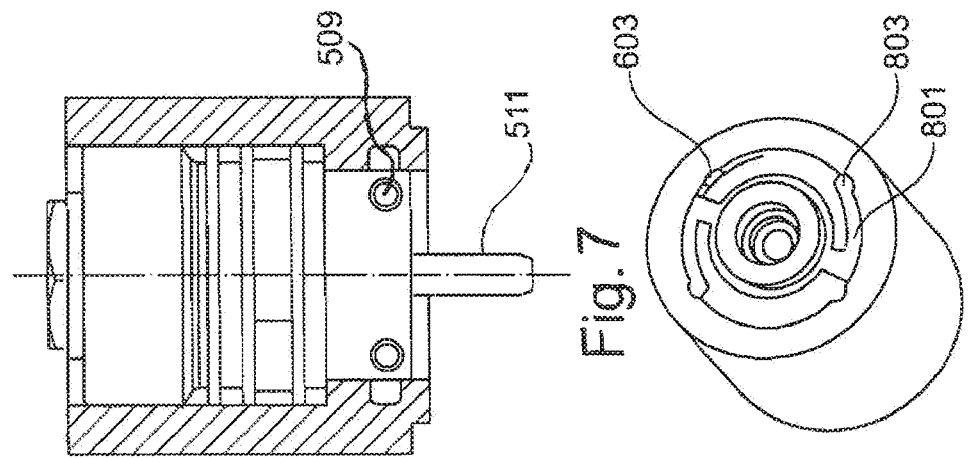
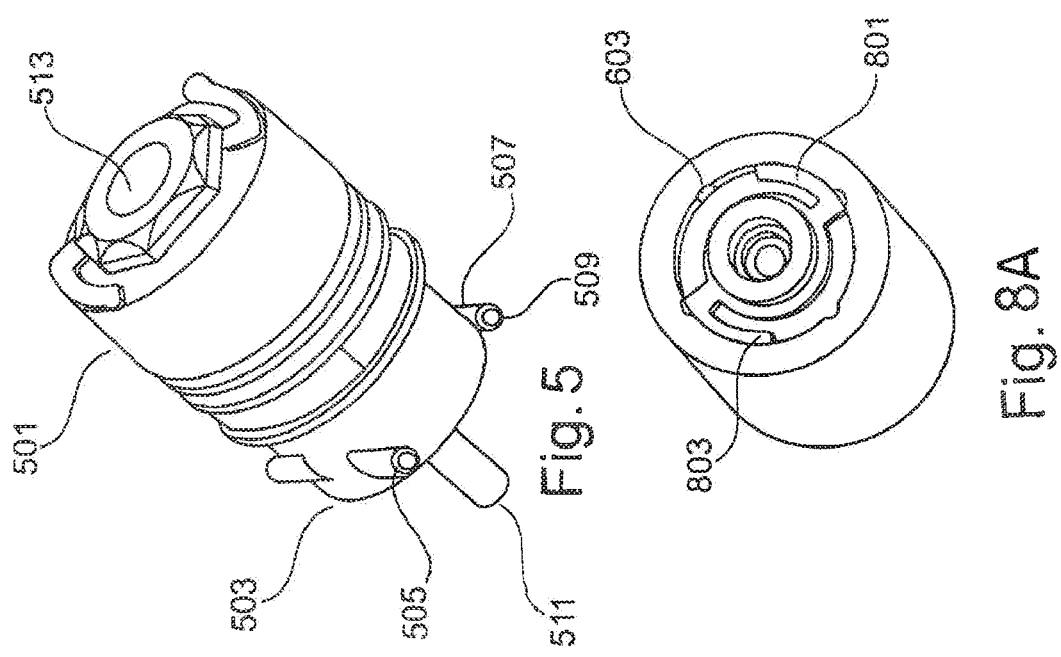

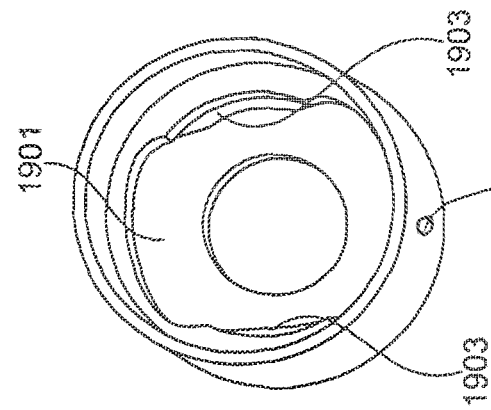
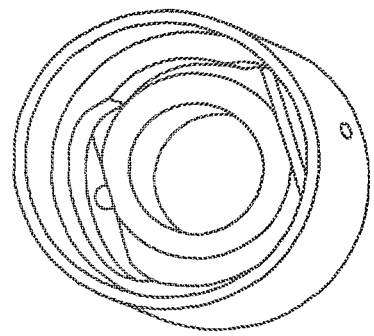
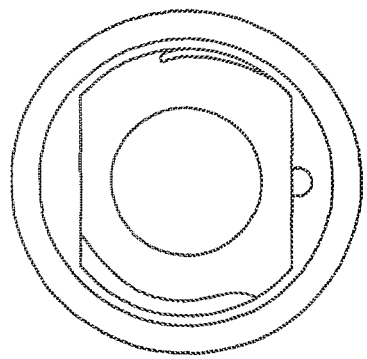
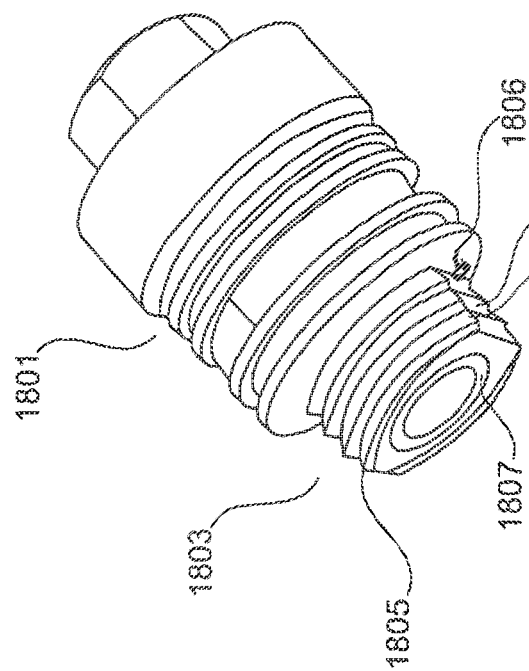
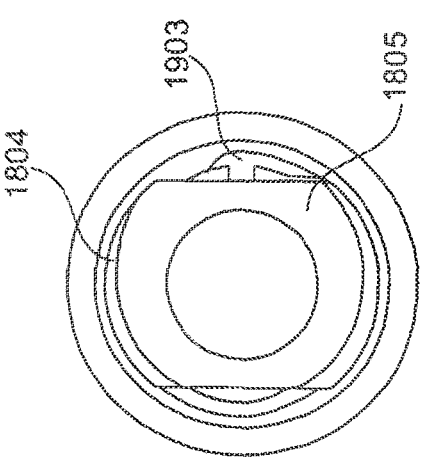

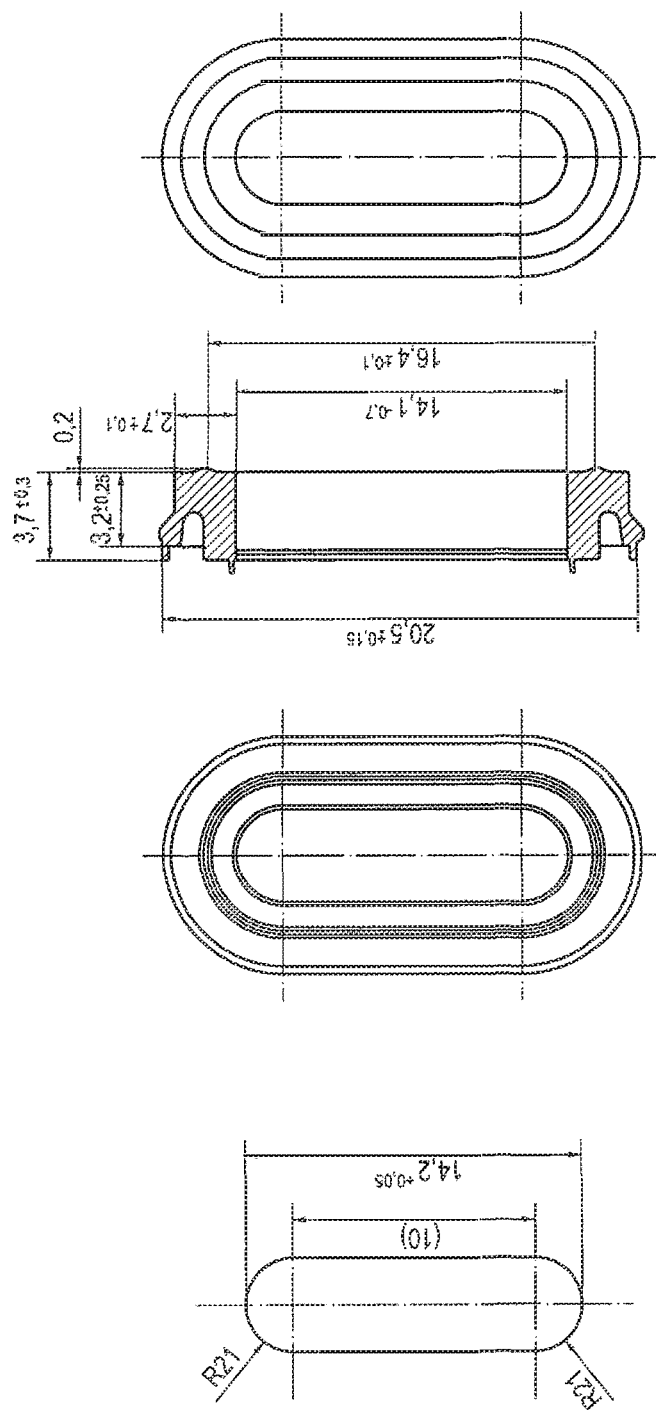

Section A-A
3:1

2:1
Front side

2:1
Rear side

COATING AGENT DEVICE AND COATING DEVICE

CROSS-REFERENCES TO RELATED APPLICATIONS

This application is a Divisional Application of U.S. patent application Ser. No. 15/351,583, filed on Nov. 15, 2016 (U.S. Pat. No. 9,839,933 issued Dec. 12, 2017), which is a Continuation Application of U.S. patent application Ser. No. 13/319,241, filed on Jan. 23, 2012 (U.S. Pat. No. 9,528,539 issued Dec. 27, 2016), which is a National Stage application which claims the benefit of International Application No. PCT/EP2010/002760 filed May 5, 2010, which claims priority based on German Application No. DE 10 2009 020 077.0, filed May 6, 2009, all of which are hereby incorporated by reference in their entireties. This application is also related to U.S. patent application Ser. No. 15/808,987, filed on Nov. 10, 2017.

FIELD

The present disclosure relates to the field of coating workpieces, in particular car body parts.

BACKGROUND

To coat workpieces, coating devices, for example electrostatic rotary atomizers or colour changers are usually used, to which the coating agent to be applied is fed, for example by means of a valve, for example a coating agent valve.

The valves in painting technology are usually constructed with a round pneumatic piston, it being possible for the pneumatic drive of the valve to take place via a control air space, a piston seal and a spring, which are situated in a round housing. A cylinder, in which a movable valve needle is arranged, is usually formed in the round housing. During operation, the valve needles are therefore exposed to the coating agent applied in each case and have to be cleaned, for example by brief flushing with air. Owing to the arrangement of the valve needles in coating agent cylinders, such cleaning is however difficult for design reasons. The coating agent valves are also screwed into the coating agent devices on the discharge side, so they have to be unscrewed for cleaning or maintenance purposes, with a great deal of effort. Such threaded connections furthermore do not permit a tighter arrangement of the coating agent valves in a coating agent device, which reduces system efficiency. The known coating systems with such coating agent valves and coating agent devices are therefore high-maintenance and inefficient.

Some known valves are furthermore constructed multiple materials, e.g., stainless steel and plastic. These pairs of materials are usually connected using screw-fastenings, adhesives, injection moulding transversely to the axis of symmetry of the valve needle. These pairs of materials result in abrasion during use, which entails an increased maintenance frequency.

Reference is also made to EP 1 157 747 A2 and corresponding U.S. Pat. No. 6,315,168.

Accordingly, there is a need for a more efficient coating system concept which is easier to maintain and clean.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 1 shows a coating agent device, according to an exemplary illustration;

FIG. 2 shows a housing of a coating agent device, according to an exemplary illustration;

FIG. 3 shows a spring ring, according to an exemplary illustration;

FIG. 4 shows an exemplary coating agent device in the installed state;

FIG. 5 shows a coating agent device, according to an exemplary illustration;

FIG. 6 shows a housing of a coating agent device, according to an exemplary illustration;

FIG. 7 shows the exemplary coating agent device of FIG. 5 in an installed state;

FIGS. 8A and 8B show a plan view of a receiving sleeve, according to an exemplary illustration;

FIG. 18 shows an exemplary coating agent device;

FIG. 19A shows an exemplary receiving sleeve;

FIGS. 19B, 19C and 19D illustrate a rotation securement, according to an exemplary illustration;

FIGS. 31A to 31D show views of an oval piston element, according to an exemplary illustration;

DETAILED DESCRIPTION

Figure 10:
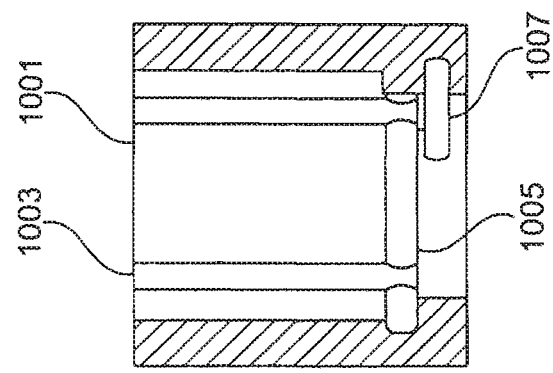
FIG. 10 shows a housing of a coating device, according to an exemplary illustration.

The exemplary illustrations are generally based on the finding that a more efficient coating system concept can be realized in that a pluggable or plug-in connection can be used, which can also be rotating secured or secured to prevent relative rotation between two components, to couple coating agent devices, for example coating agent valves, to coating devices such as atomizers or colour changers. For example, a coating agent valve can be connected efficiently to a colour changer by means of a bayonet connection and can therefore be replaced quickly and easily.

The exemplary illustrations are based on the further finding that a coating system concept which is easier to clean can be realized by a suitable geometric shape of the valve needle of a coating agent valve. To this end, the ends of the valve needles in particular can be provided with an additional portion which tapers at a certain angle, by means of which the space surrounding the valve needle in a cylinder is increased.

The exemplary illustrations are based on the further finding that a coating system concept which is easier to maintain can be realized by a more abrasion-resistant configuration of a valve needle of a coating agent valve. To this end, a plastic shaft of the valve needle can additionally be covered with an abrasion-resistant sheath, as a result of which the damaging abrasion is minimized and the service life of the valve needle is increased.

The exemplary illustrations are based on the further finding that a packing density of the coating agent devices such as coating valves in a coating device of the abovementioned type can be increased in that a rear-side drive interface and a housing of a coating agent valve are not circular but for example elongate and have for example form-fitting geometric shapes, so a plurality of coating agent devices can be arranged closer to each other, for example in a form-fitting manner in a coating agent device such as a colour changer.

According to one aspect of an exemplary illustration, a coating agent device may be provided, for example a coating agent valve, for influencing a discharge of a coating agent, for example an automotive paint. The coating agent device may comprise a pluggable mounting socket for holding the same in for example a coating device such as an atomizer or a colour changer. The coating agent device is thus held by a plug-in connection in such a manner that it can be replaced quickly.

Coating agent valves are described by way of example below. The configurations below however apply correspondingly to any valves which can be used to coat workpieces.

According to one exemplary illustration, the coating agent device comprises a movable discharge means, for example a valve needle, to discharge the coating agent in a controllable manner. The pluggable mounting socket can at least partially comprise or surround the movable discharge means and/or a coating agent cylinder on the discharge side.

According to one exemplary illustration, the coating agent device comprises an output for discharging the coating agent, wherein the pluggable mounting socket can be provided to couple the output of the coating agent device to a coating device, for example to an atomizer or a colour changer. This permits a simple, discharge-side connection of the coating agent device to the coating device which is easy to maintain.

According to one exemplary illustration, the pluggable mounting socket can for example latch or snap in by means of a latch or snap arrangement, as a result of which the fit of the mounting socket can be secured.

According to one exemplary illustration, the pluggable mounting socket can be rotating secured. The rotation securement can for example be implemented after insertion of the pluggable mounting socket in for example a receiving sleeve of a coating device.

According to one exemplary illustration, the pluggable mounting socket comprises a bayonet connection, for example a symmetrical or asymmetrical bayonet connection, or a bayonet connection provided with a bayonet thread which can be laterally at least partially flattened in the axial direction. A quick and secure rotation securement can be realized thereby.

According to one example, at least one holding element is provided for rotation securement of the pluggable mounting socket, which holding element extends outwards from a wall of the pluggable mounting socket. At least one recess, which can be provided to receive a holding element, can also be formed in the wall for rotation securement. This ensures secure latching of a bayonet connection.

According to one example, a holding pin is embedded in the pluggable mounting socket, the outwardly guided end of which forms a holding element. Furthermore, both ends of the holding pin can be guided outwardly in parallel and thus form opposite holding elements. Furthermore, a plurality of holding pins can be embedded in the pluggable mounting socket in for example the same cross-sectional plane or in different cross-sectional planes, in each case at least one end of the respective holding pin is guided outwardly and forms a holding element. A rotation securement stop can thereby be realized in particular in a rotating secured connection.

According to one exemplary illustration, the holding element can be a ball pin. Furthermore, a wall of the pluggable mounting socket can be provided with a multiplicity of ball pins, which are arranged in the same cross-sectional plane of the wall or in different cross-sectional planes of the wall and each form a holding element, as a result of which a rotary angle of the rotating secured connection can be limited.

According to one exemplary illustration, a wall of the pluggable mounting socket is provided with an at least partially circumferential annular groove or holding ledge for rotation securement. Thereby, a friction-locking rotation securement can be simply realized.

According to one example, a wall of the pluggable mounting socket comprises a thread for rotation securement, which thread can for example be laterally axially flattened, as a result of which the pluggable mounting socket is insertable according to the "key-hole principle" and rotating securable. The wall of the pluggable mounting socket can to this end have wall portions which extend in the axial direction of the pluggable mounting socket and are thread-free or provided with thread flights or thread flanks which are flatter than that of other wall sections of the wall, which are arranged in a rotationally symmetrical or rotationally asymmetrical manner. A simple and secure rotating securement of the pluggable mounting socket can thereby be realized.

According to a further aspect, in one example a coating agent device is provided for influencing a discharge of a coating agent. An exemplary coating agent device may comprise a mounting socket for holding the coating agent device in for example a coating device such as an atomizer or a colour changer. The wall of the mounting socket is, in one exemplary illustration, provided with a thread, the pitch of which is within a pitch range of between 1.5 and 3. This achieves fastening of the coating agent device which can be released quickly and is easy to maintain. The coating agent device can, according to one example, have the features of the above- and/or below-mentioned coating agent devices.

According to one exemplary illustration, the thread comprises rounded thread flanks and/or rounded thread flights, which can be rounded at a rounding inclination angle of for example 28°, 29°, 30°, 31° or 32°. This makes it possible for the thread to engage more quickly.

According to one example, the thread is circumferential and continuous. The wall can however have thread-free portions which extend axially, as a result of which a pluggable connection can also be realized. In this case, the thread acts as a quick rotation securement.

According to one exemplary illustration, the coating agent device comprises an output for discharging the coating agent, wherein the mounting socket is provided to couple the output to a coating device, for example to an atomizer or a colour changer. The mounting socket is thus arranged on the output side.

According to a further aspect, some exemplary illustrations relate to a coating agent device of the above-mentioned type with a drive interface for coupling a drive device, in particular a pneumatic valve drive, to the coating agent device, which can be a coating valve. The drive interface may have an elongate cross section, as a result of which a packing density of coating agent devices of the same type can be increased by space-saving arranging the same next to each other.

According to one example, the cross section of the drive interface, i.e. the connection cross section of the same, is completely or at least partially oval and is formed for example to arrange a plurality of coating agent devices of the same type next to each other in an at least partially form-fitting manner. To this end, the drive interface can have for example form-fitting elements such as convex or concave regions, which can be introduced into each other when coating agent devices of the same type are arranged next to each other, as a result of which the packing density of the coating agent devices can be increased.

According to one exemplary illustration, the drive interface comprises at least two convex fastening regions, which can be arranged in a diagonally mirrored manner, for mechanically holding the coating agent device using for example a screw connection. An axial securement of the coating agent device, which can for example be pluggable, is realized thereby.

According to one example, the drive interface comprises at least one control input for receiving a drive signal of the drive device, for example an air pressure signal, for driving a valve needle of the coating agent device.

According to one exemplary illustration, a cross section of a housing of the coating agent device arranged downstream of the drive interface at least partially takes up the cross section of the drive interface. A contour of the housing of the coating agent device thus corresponds completely or at least partially to a contour of the drive interface, as a result of which an efficient arrangement of a plurality of coating agent devices of the same type is made possible.

Exemplary coating agent devices can furthermore have the features of the above- and/or below-mentioned coating agent devices.

According to a further aspect, in one exemplary illustration, a coating agent device of the above-mentioned type may be provided, which is or comprises a coating agent valve with a plurality of outwardly guided valve needles. The valve needles can for example seal off different valve seats of a coating device with which the coating agent device can be coupled, as result of which a coating efficiency can be increased.

According to one exemplary illustration, at least two valve needles of the plurality of valve needles have a different geometric shape, for example a different length and/or a different thickness, so different valve needles can be used for different purposes.

In one example, at least two valve needles of the plurality of valve needles are operable together or independently of each other, as a result of which a high degree of operating flexibility can be achieved.

According to one exemplary illustration, a plurality of control inputs are provided for the separate actuation of different valve needles, for example with air pressure. Furthermore, a control input can be provided for a plurality of valve needles. This makes simple and efficient actuation of the valve needles possible.

In one example, the valve needles are arranged in parallel, so a plurality of valve seats, arranged opposite and in parallel, can be sealed off.

According to one exemplary illustration, a first valve needle of the plurality of the valve needles is provided for brief flushing with a flushing agent, for example with a diluent or solvent. A second valve needle can be provided for brief flushing with air. Furthermore, a first valve needle can be provided for discharging a coating agent, for example a paint, and second valve needle can be provided for feeding back the coating agent, as a result of which a high degree of flexibility of the coating agent device can be achieved. The same is correspondingly possible for a hardener and a corresponding hardener valve.

The coating agent device can furthermore have features of the above- and below-mentioned coating agent devices.

According to a further aspect, some exemplary illustrations relate to a coating agent device of the above-mentioned type, which is or comprises a valve needle. One end of the valve needle, which may interacts with a valve seat, may comprise a guide portion for introducing the valve needle into the valve seat, a sealing portion for pressing the valve needle against the valve seat and a flushing portion for creating a flushing space for flushing the valve needle. The guide portion, sealing portion and flushing portion may taper at different inclination angles, so that the valve needle tip is for example conically flattened three times. The additional flushing portion simplifies the flushing of the valve needle, as a result of which the coating agent device can be maintained easily.

According to one exemplary illustration, the sections are arranged such that they follow each other directly, so the sealing portion is arranged downstream of the flushing portion and the guide portion is arranged downstream of the sealing portion.

In one example, the inclination angle of the guide portion is 120°±30°, the inclination angle of the sealing portion 30°±12°, and the inclination angle of the flushing portion is 10°±5°, as a result of which simple cleaning of the valve needles can be ensured.

The coating agent device can have the features of the above- and below-described coating agent devices.

According to a further aspect, some exemplary illustrations are directed to a coating agent device of the above-mentioned type, which is or comprises a valve needle. The valve needle comprises a valve needle shaft, which can consist of plastic, and a sheath which at least partially covers the valve needle shaft and is formed from a material which is more abrasion-resistant than the material of the valve needle shaft. A more abrasion-resistant configuration of the valve needle is advantageously realized thereby, as a result of which the service life thereof is increased. The pairing of seal seat and needle material, i.e. soft plastic tip with seal seat consisting of VA or polyoxymethylene (POM) is always important. The problem with the use of a VA needle tip is working in (wear) in the plastic seat. According to one example, the sheath is formed from ceramic or a ceramic composite or metal.

Exemplary coating devices can furthermore have the features of the above- and/or below-described coating agent devices.

According to a further aspect, some exemplary illustrations are directed to a coating device, for example an atomizer, in particular an electrostatic atomizer, or a colour changer or functional valves (e.g. flushing valves, in particular brief flushing valves), which has a receiving sleeve provided for receiving a mounting socket of the coating agent device which is formed as described above. The mounting socket of the coating agent device can for example be pluggable into the receiving sleeve in order to realize a plug-in connection.

According to one exemplary illustration, the receiving sleeve for receiving a mounting socket is provided with a bayonet connection. To this end, the receiving sleeve can for example have a resilient element, for example a spring ring, which is provided for receiving the bayonet connection in a rotation secured manner.

According to one example, a groove, for example a helical groove, is formed in a wall for receiving a holding element of a coating agent device of the above-mentioned type in a rotation secured manner. Furthermore, a plurality of grooves, in particular a plurality of helical grooves, can be provided for receiving elements arranged in different cross-sectional planes of the wall of a mounting socket of a coating agent device of the above-mentioned type.

According to one example, the sleeve is provided for receiving a mounting socket of a coating agent device, the wall of which is provided with an at least partially circumferential annular groove or holding ledge for rotation securement. The wall of the receiving sleeve may be provided with a holding ledge for receiving the annular groove or with an at least partially circumferential annular groove for the holding ledge, as a result of which an efficient rotation securement can be realized.

According to one exemplary illustration, a wall of the receiving sleeve comprises a thread for rotating securement of a mounting socket of a coating agent device of the above-mentioned type against rotating. In one example, wall portions of the wall which are thread-free or provided with thread flights and/or thread flanks which are flatter than that of other wall portions extend in the axial direction of the wall, which can be arranged in a rotationally symmetrical or rotationally asymmetrical manner. This means that mounting sockets can be fastened using the "key-hole principle".

In one example, the wall of the receiving sleeve is provided with a thread for receiving a mounting socket, the pitch of which is between 1 and 3, as a result of which an efficient fastening of the mounting socket can be realized.

According to a further aspect, some exemplary illustrations relate to a use of the coating agent device and/or the coating device of the above-mentioned type for coating car bodies.

FIG. 1 shows a coating agent device, which can be a valve and is provided for influencing a discharge of a coating agent. The coating agent device may comprise a pluggable mounting socket 101 for pluggable holding the coating agent device. The pluggable mounting socket 101 is for example connected to a housing 103 of the coating agent device.

The pluggable mounting socket may be provided with a helical groove 105, which has an optional fixing groove 107 for receiving a fixing nose. The coating agent device further comprises a valve needle 109 on the output side, which is at least partially surrounded by the pluggable mounting socket 101, wherein one end of the mounting socket 101 can be provided with a groove 111 for a sealing ring.

FIG. 2 shows a housing of a corresponding coating agent device, which is provided with a receiving sleeve 201 for receiving the pluggable mounting socket 101 of the coating device of FIG. 1. A groove 203, which can have a spring ring 205 is therefore formed in the receiving sleeve 201. The spring ring 205 is provided for receiving the helical groove 105 shown in FIG. 1.

FIG. 3 shows a spring ring which is an elastic element and is for example bent in an at least partially circular manner and can correspond to the spring ring 205. The spring ring comprises at least one or two missing fixing noses 301 on its inner side, which engage in the fixing groove 107 of FIG. 1, and a rotation securement with an assembly and mounting peg 303, respectively.

FIG. 4 shows a connection of the coating agent device of FIG. 1 to the coating device of FIG. 2. As shown in FIG. 4, the resilient fixing noses 301 of the spring ring 205 engage in the fixing grooves 107.

The coating agent device shown in FIG. 1 can have, for example, one or two helical grooves 107. The spring ring 205 with the mounting peg 303 and the integrated fixing noses 301 is inserted in the groove 203 in the receiving sleeve of FIG. 2, the mounting pegs 303 engaging in the helical groove during installation. The pluggable mounting socket 101 is introduced into the sleeve 201 and rotated for example 65° for the purpose of rotation securement. To remove the coating agent device, it is rotated back and withdrawn. As a result, it is possible to use direct fastening elements. Furthermore, large bearing surfaces can be realized between the spring ring 205 and the housing. The spring ring 205 can further be replaced simply. Furthermore, a contour of the housing of the coating device shown in FIG. 2 is simple.

FIG. 5 shows a coating agent device, for example a coating agent valve, with a housing 501 and a pluggable mounting socket 503. Two holding pins 505 and 507 are embedded in the pluggable mounting socket 503, for example in a valve socket, transversely in a cross-sectional plane of the mounting socket. The holding pins 505 and 507 have outwardly guided ends 509, by means of which holding elements are formed. The coating agent device further comprises a valve needle 511, which is arranged on the discharge side. A control input 513 for actuating the valve needle 511 with for example compressed air is provided on the input side.

FIG. 6 shows a housing of a coating agent device, for example of an air atomizer or of a colour changer, with a receiving sleeve 601 for receiving the pluggable mounting socket 503 of FIG. 5. The receiving sleeve 601 comprises axial recesses 603 in which the holding elements 509 can be guided. Furthermore, a for example circumferential recess 605 is provided for rotation securement.

FIG. 7 shows the coating agent device of FIG. 5 in the installed state.

FIGS. 8A and 8B show a plan view onto the receiving sleeve 601 with the axial recesses 603, which can for example be formed by axial grooves. A spring ring 801 with angled arms provided with holding beads 803 is also arranged in the receiving sleeve. The holding beads 803 latch into the axial recess 603 for rotation securement, as shown in FIG. 8B. To install the coating agent device of FIG. 5, the mounting socket 503 thereof is inserted into the receiving sleeve 601 and for example rotated 90° until the rotation securement latches. It automatically unlatches when the coating agent device is rotated back, so that the coating agent device can be pulled out again after a 90° turn. A further advantage of this is the possibility of a visual check of the valve position by the latching of the rotation securement.

Figure 9:
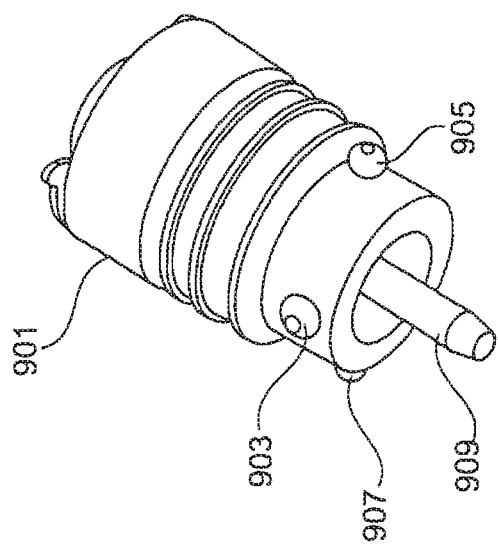
FIG. 9 shows an exemplary coating agent device.

FIG. 9 shows a coating agent device with a housing 901 and a pluggable mounting socket 903, in which two holding pins 905 and 907, which are for example configured as standard pins, are arranged in different cross-sectional planes. The coating agent device further comprises a valve needle 909 on the discharge side.

The holding pins 905 and 907 may have end portions which are outwardly guided as holding elements.

FIG. 10 shows a housing of a coating agent device with a receiving sleeve 1001 in which four axial recesses 1003, for example axial grooves, are arranged. Furthermore, two circumferential grooves 1005 and 1007 are milled in with for example a radial stop at an angle of approximately 270°.

Figure 11:
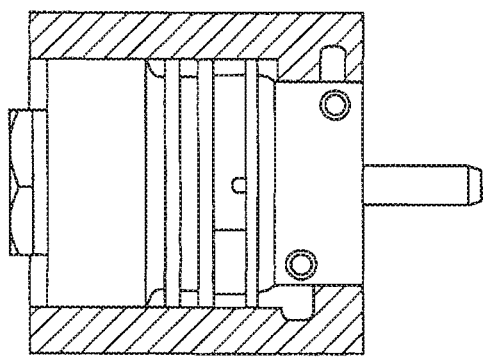
FIG. 11 shows the exemplary coating agent device of FIG. 9 in an installed state.

FIG. 11 shows the coating agent device of FIG. 9 in the installed state. To do this, the pluggable mounting socket 903 is introduced into the sleeve 1001 and for example rotated 90° until the stop, as a result of which the rotation securement latches. To remove the coating agent device, the rotation securement unlatches when the coating agent device is rotated back through 90°, so that the coating agent device can be pulled out. A further advantage of this is in particular that the rotation securement stop is defined and that a visual check of the valve position can be realized by the latching of the rotation securement.

Figure 12:
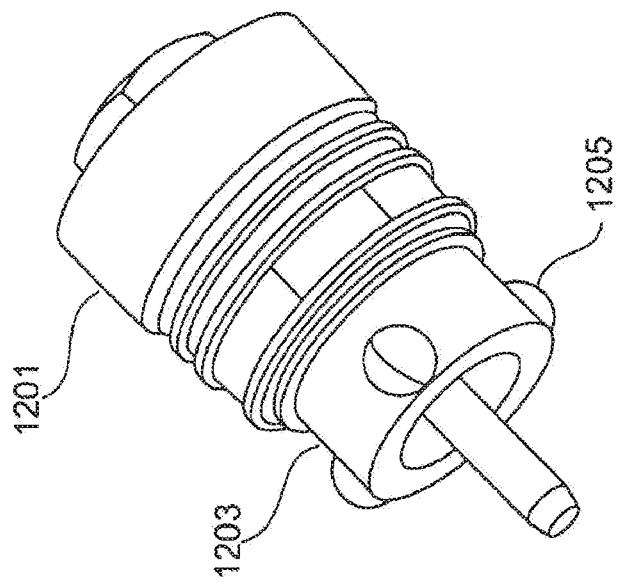
FIG. 12 shows a coating agent device, according to an exemplary illustration.

FIG. 12 shows a coating agent device, for example a coating agent valve, with a housing 1201 and a pluggable mounting socket 1203, the wall of which is provided with for example three ball pins 1205, which can be standardized, transversely in a cross-sectional plane. The ball pins 1205 can be at least partially embedded in the mounting socket 1203, so that the projecting portions thereof can form holding elements for rotation securement.

Figure 13:
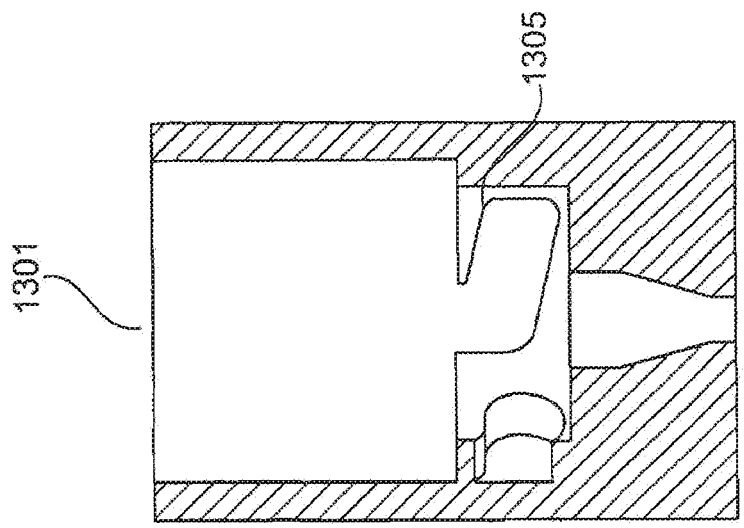
FIG. 13 shows a housing of a coating device, according to an exemplary illustration.

FIG. 13 shows a housing of a coating device with a receiving sleeve 1301 for receiving the mounting socket 1203 of FIG. 1. The receiving sleeve 1301 may be provided with a plurality of, for example three, helical grooves 1305, the pitch of which can be respectively 10% and the lift of which can be 1 mm. The helical grooves 1305 are for example milled. The ball pins 205 can also be configured as pins. They can further be milled directly out of the valve housing as pegs. The helical grooves 305 have the advantage that they allow high fastening force with a simple housing contour, which provides a secure connection.

Figure 14:
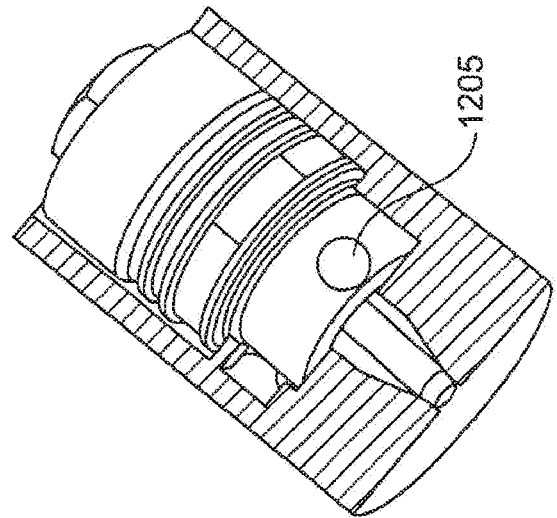
FIG. 14 shows the exemplary coating agent device of FIG. 12 in an installed state.

FIG. 14 shows the coating agent device of FIG. 12 in the installed state. To do this, the mounting socket 1203 thereof may be inserted into the receiving sleeve 1301 and for example rotated 60° until the stop. The rotation securement is effected in this case by a tension of a needle seal in the friction lock. To remove the coating agent device, it is rotated back and pulled out.

Figure 15:
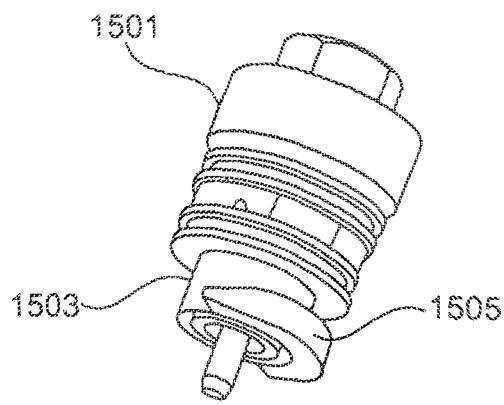
FIG. 15 shows a coating agent device, according to an exemplary illustration.

FIG. 15 shows a coating agent device, for example a valve, with a valve housing 1501 and a pluggable mounting socket 1503 with a peg segment 1505 which can be milled with a tensioning pitch of 1.5 mm and 20° by for example 180°.

Figure 16:
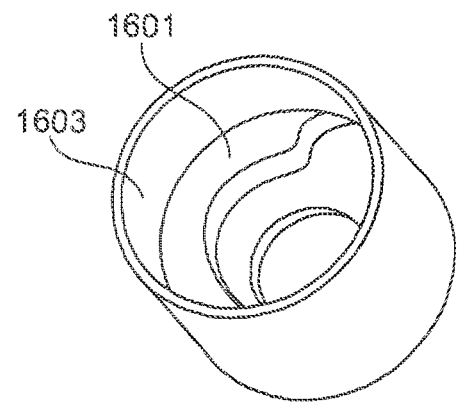
FIG. 16 shows a housing of a coating device, according to an exemplary illustration.

FIG. 16 shows a housing of a coating agent device with a receiving sleeve 1601 for receiving the mounting socket 1503 of FIG. 15. The receiving sleeve 1601 is provided with a holding ledge 1603, which for example extends 160°.

Figure 17A:
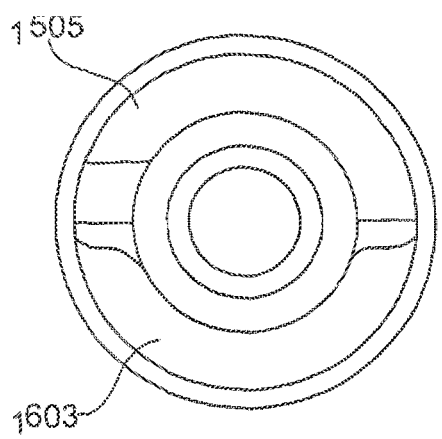
FIGS. 17A to 17D illustrate a fastening of a mounting socket, according to an exemplary illustration.
Figure 17B:
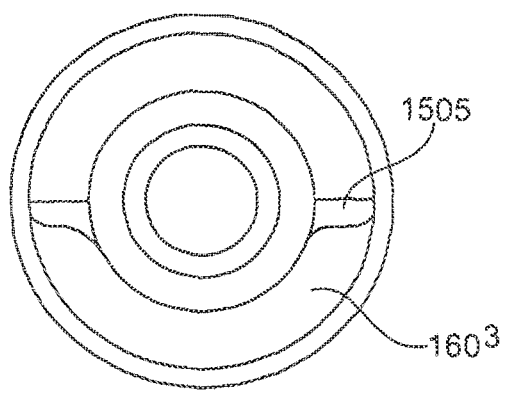
Figure 17C:
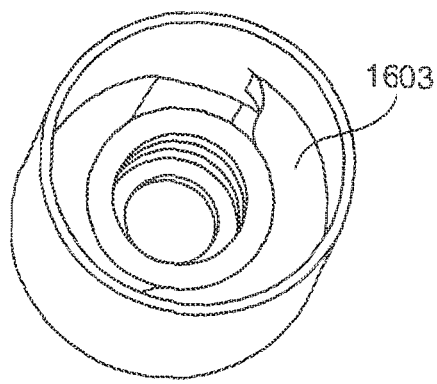
Figure 17D:
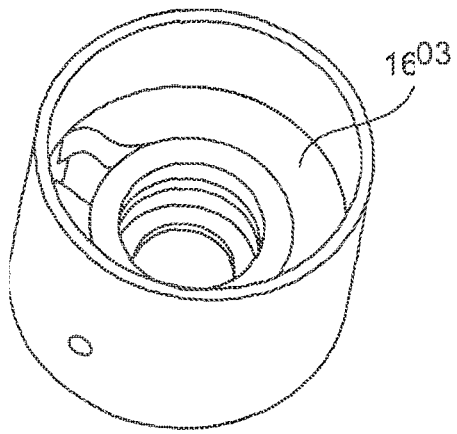

FIGS. 17A to 17D show the fastening of the mounting socket 1503 shown in FIG. 15 in the receiving sleeve 1601. FIG. 17A shows the mounting socket 1503 in the inserted but not yet rotated state. FIGS. 17B to 17D show the fastening in the rotation secured state.

FIG. 18 shows a coating agent device, for example a valve, with a valve housing 1801 and a pluggable mounting socket 1803, which is partially surrounded with a thread 1804 which has axially flattened portions 1805. The flattened portions 1805 can be symmetrical milled voids, whereby the mounting socket is introduced according to the "key-hole" principle into a receiving sleeve and can be rotated in it for the purpose of rotation securement. The mounting socket 1803 is further provided with an optional positioning pin 1806 for positioning the introduction thereof in a receiving sleeve.

FIG. 19A shows a housing of a coating device with a receiving sleeve 1901 for receiving the mounting socket 1803. The receiving sleeve 1901 may be, for example, elongate and may comprise lateral threaded segments 1903 for receiving the threaded portions of the mounting socket. The receiving sleeve is further optionally provided with a leakage bore 1905. The receiving sleeve 1901 shown in FIG. 19A has symmetrically arranged threaded recesses for receiving the thread 1804. These can however also be arranged asymmetrically.

FIGS. 19B, 19C and 19D show a rotation securement of the mounting socket 1803 in the receiving sleeve 1901. FIGS. 19C and 19D show the rotation secured state.

The thread 1804 of the mounting socket can be a M14×1.5 thread, which is milled on two sides, for example symmetrically or asymmetrically. Corresponding to this, the receiving sleeve 1901 is recessed on two sides. The radial pin 1806 can act for example for unambiguous positioning, wherein on the end face a sealing ring can be provided in a groove 1807 for sealing the leakage. For installation, the mounting socket 1803 is inserted into the receiving sleeve and for example rotated 90° to 110°. The rotation securement is realized by frictional locking tension of a needle seal. To remove the coating agent device, it is rotated back and pulled out.

Figure 20B:
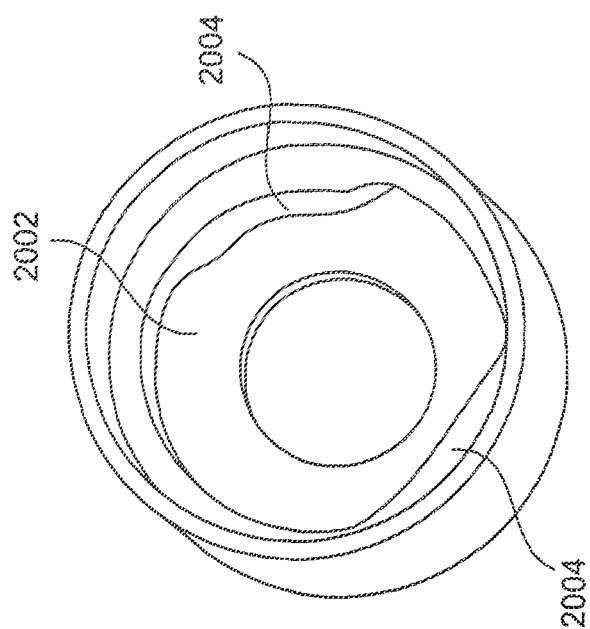
FIG. 20B shows an exemplary receiving sleeve.
Figure 20E:
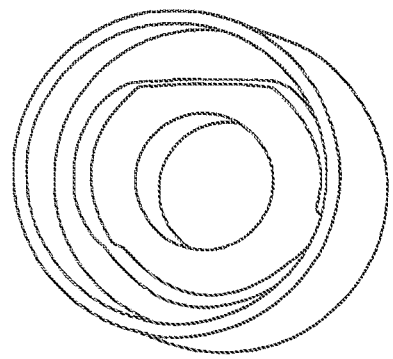
FIGS. 20C to 20E illustrate a rotation securement, according to an exemplary illustration.
Figure 20D:
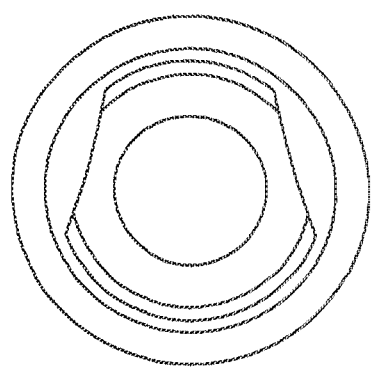
Figure 20A:
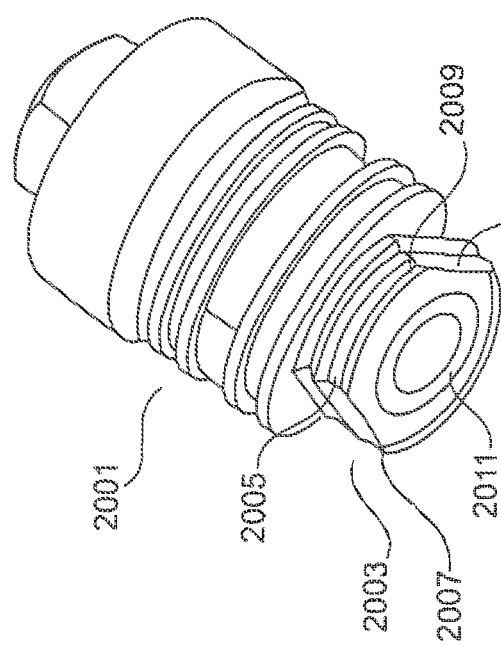
FIG. 20A shows a coating agent device, according to an exemplary illustration.

FIG. 20A shows a coating agent device, for example a valve, with a housing 2001 and a pluggable mounting socket 2003, which has asymmetrically arranged, axially extending threaded portions 2005, which are separated by asymmetrical, axial milled voids 2007. The mounting socket 2003 further comprises a leakage bore 2009 and a groove 2011 for a sealing ring. A valve needle which can be arranged in a cylinder of the mounting socket 2103 is not shown.

FIG. 20B shows a contour of a housing of a corresponding coating device, for example of an atomizer or of a colour changer, with an asymmetrically formed receiving sleeve 2002, which has asymmetrically arranged threaded segments 2004.

Figure 20C:
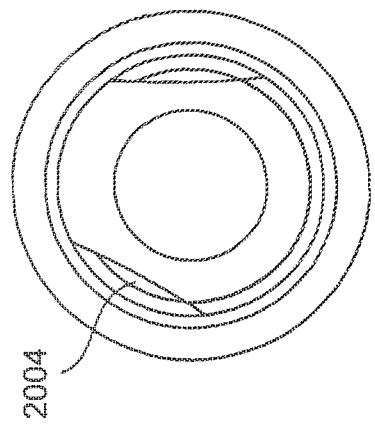

FIGS. 20C to 20E show the coating agent device of FIG. 20A in the installed state. FIG. 20C shows an inserted state and FIGS. 20D to 20E illustrate the rotation securement.

The thread 2005 can for example be milled asymmetrically for 30° on two sides, wherein accordingly in the receiving sleeve 2002 the same thread can be provided and thereafter be recessed on two sides. The unambiguous positioning of the mounting socket 2003 in the receiving sleeve 2002 can be realized by means of the asymmetrical surfaces using the "key-hole" principle. The rotation securement may be realized by frictional tension of a needle seal. To install the coating agent device, it is rotated for example approximately 75° and thereby rotation secured. To remove the coating agent device, it is rotated back and pulled out. The advantage of this is in particular that the positioning can be made visible by means of a wedge shape and that no positioning pin is necessary.

Figure 21:
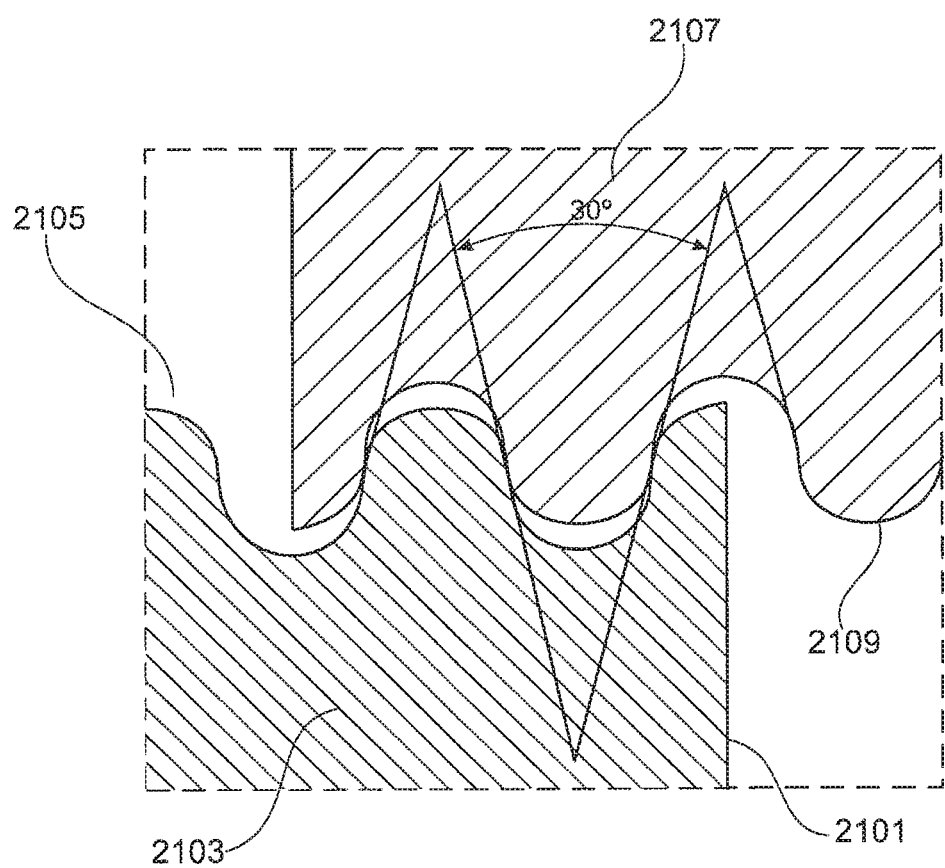
FIG. 21 shows an exemplary coating agent device.

FIG. 21 shows a section of a mounting socket 2101 of a coating agent device 2103. The mounting socket 2101 is provided with a special thread 2105, the pitch of which can be 1.5 to 3. An inclination angle of the thread is for example 30°, as shown in FIG. 21. FIG. 21 further shows a section of a receiving sleeve 2107 which forms a valve housing. The receiving sleeve comprises a wall which is provided with a corresponding thread 2109. As shown further in FIG. 21, an inclination angle of the thread 2105, 2109 can for example be 30°. Further, the thread flights and/or thread flanks are rounded, as a result of which an increased resistance to high stresses is achieved. The threads 2105, 2109 can further have a diameter of for example 10, 11, 12 or 14 mm. The threads 2105 or 2109 can be special threads, for example M11×3 thread with a rounded thread root and rounded thread crests.

The coating agent devices shown in FIGS. 1 to 21 can for example be self-locking and/or rotation secured by means of a form fit or frictional connection. The features of the above coating agent devices can further be combined with each other individually or in groups, as a result of which further advantageous examples can be realized.

Figure 22:
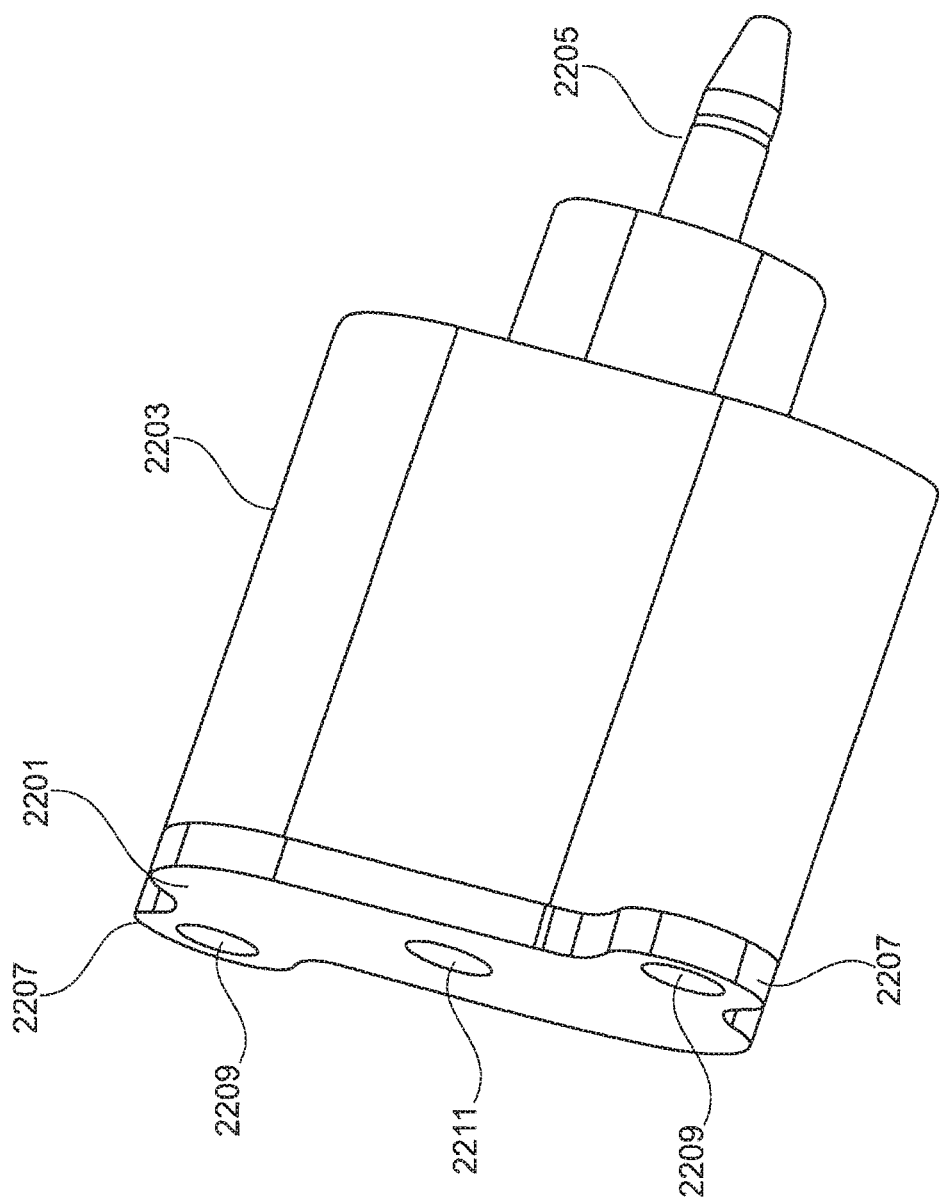
FIG. 22 shows a coating agent device, according to an exemplary illustration.

FIG. 22 shows a coating agent device, for example a coating agent valve, with a drive interface 2201, a housing 2203 arranged downstream of the latter and a valve needle 2205. The drive interface 2201 may have a substantially oval cross section, wherein outwardly curved connection regions 2207 being provided, which are each provided with a bore 2209 for receiving screws. The drive interface 2201 may further comprise a control input 2211, via which compressed air can be fed for driving the valve needle 2205 of the coating agent device.

Figure 23:
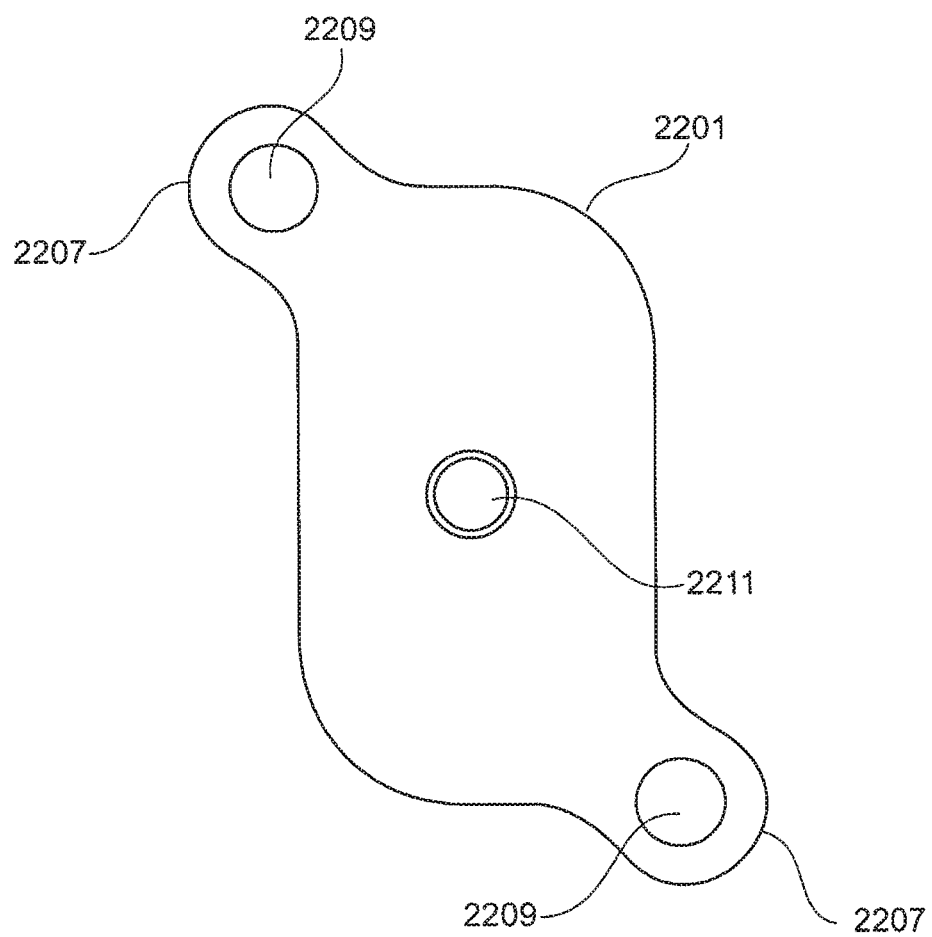
FIG. 23 shows a drive interface, according to an exemplary illustration.
Figure 24:
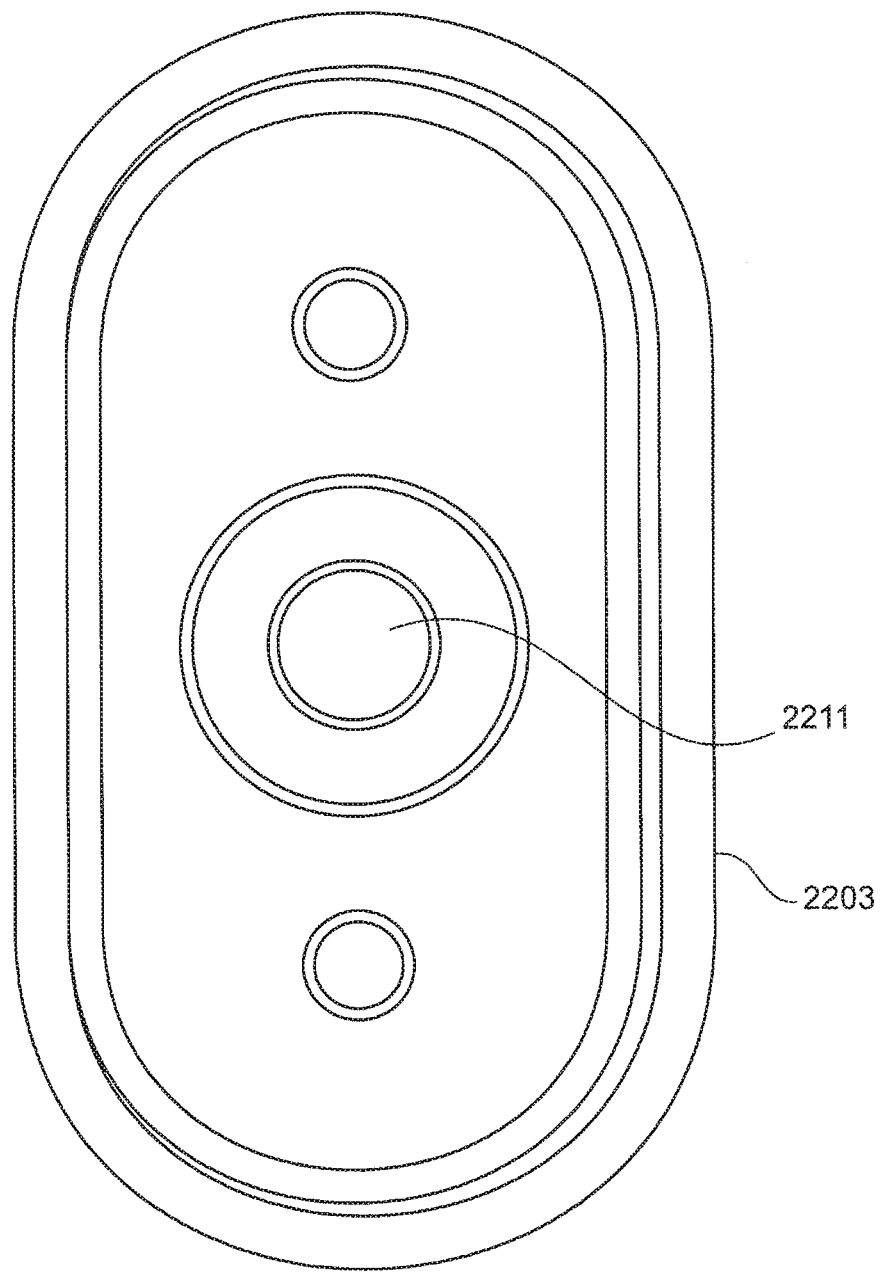
FIG. 24 shows a cross section of a housing, according to an exemplary illustration.

FIG. 23 shows a plan view of the drive interface 2201. FIG. 24 shows a cross section of the housing 2203 of the coating agent device of FIG. 22. The cross section may be substantially oval or elliptical and may assume the shape of the cross section of the drive interface 2201.

Figure 25:
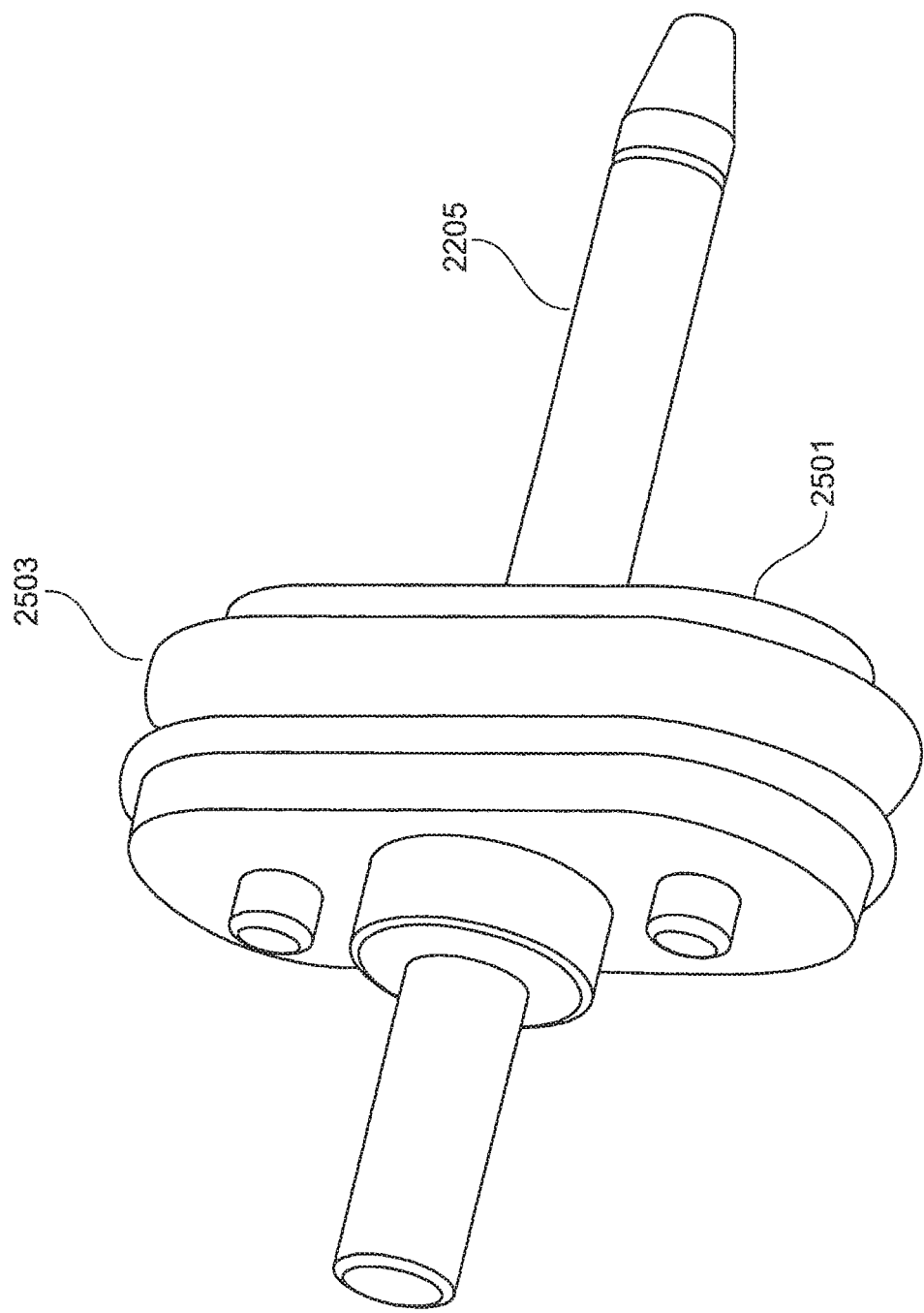
FIG. 25 shows a valve needle with a piston element, according to an exemplary illustration.

FIG. 25 shows the valve needle 2205 of FIG. 22, which is arranged in the housing 2203. The valve needle 2205 is arranged in a piston element 2501, to which compressed air can be applied, as a result of which the valve needle 2205 can be driven. The piston element 2501 laterally comprises a circumferential seal 2503, the cross section of which is oval like the cross section of the piston element 2501 and assumes the shape of the cross section of the housing 2203. The valve needle 2205 is arranged together with the piston element in a cylinder of the housing 2203.

Figure 26:
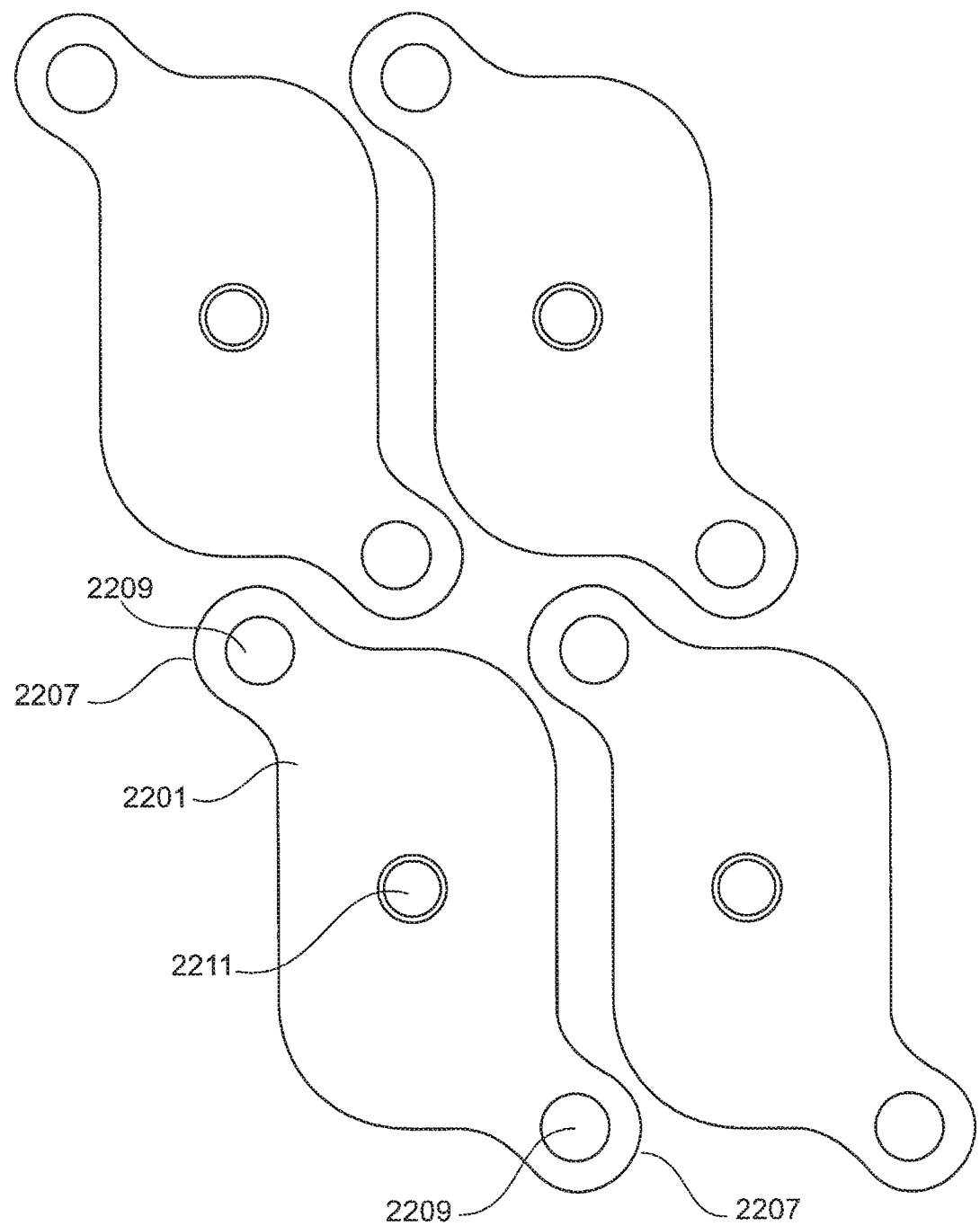
FIG. 26 shows a plan view of an arrangement of a plurality of coating agent devices, according to an exemplary illustration.

FIG. 26 shows a plan view of an arrangement of a plurality of coating agent devices, as shown in FIG. 22. As shown in FIG. 26, the elongate configuration of the valve interface 2201, which can be at least partially form-fitting as shown in FIG. 26, allows a close arrangement of the coating agent devices next to each other. This increases the packing density of the coating agent devices in a coating device of the above-mentioned type.

Figure 27:
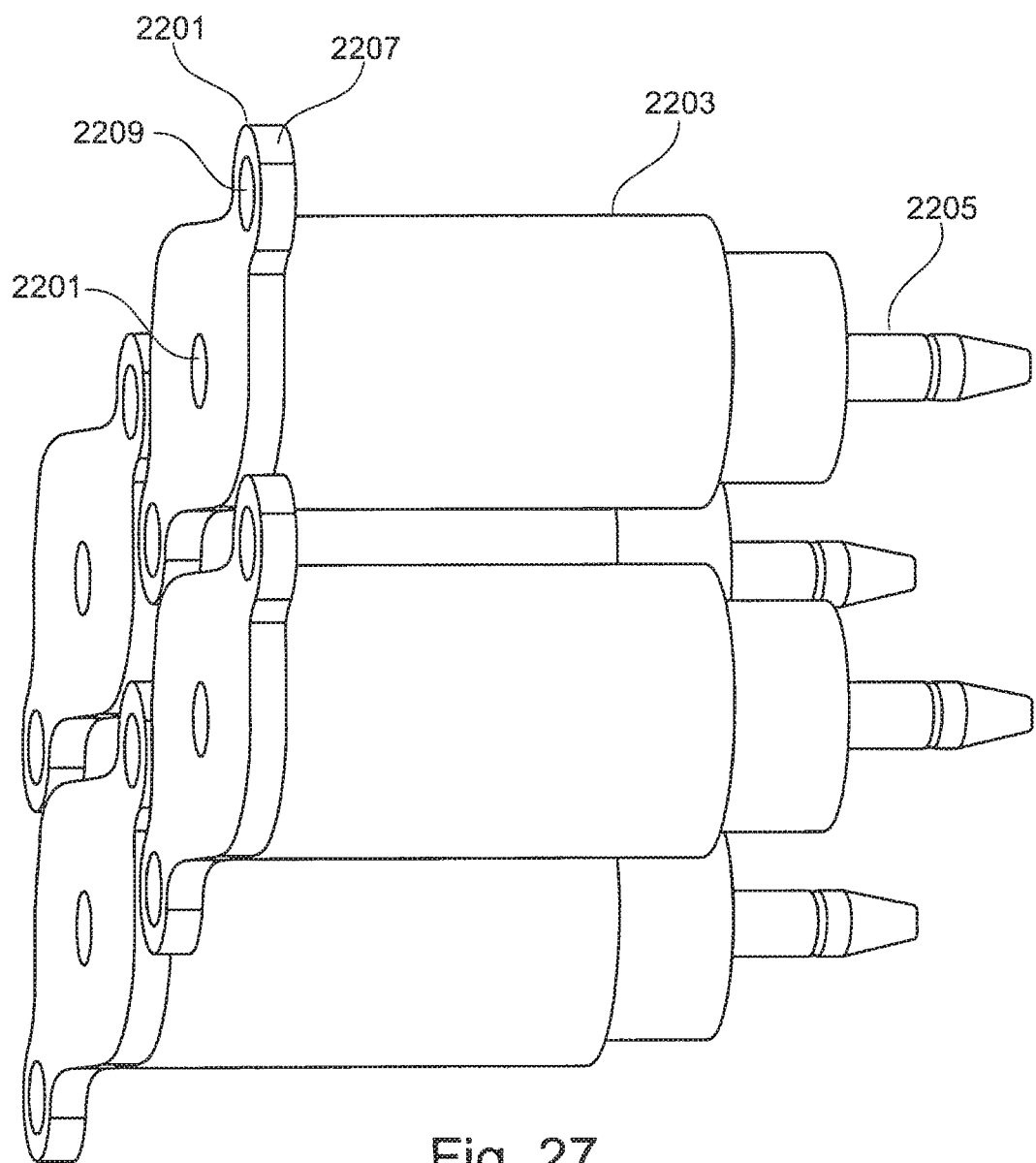
FIG. 27 shows a side view of an arrangement of a plurality of coating agent devices, according to an exemplary illustration.

FIG. 27 shows a lateral plan view of the arrangement shown in FIG. 26 of the coating agent elements of FIG. 22. As shown in FIG. 27, the coating agent devices, which can be for example valves, can advantageously be arranged closely next to each other owing to the elongate shape of the cross sections of the drive interface 2201 and of the housing 2203.

Thanks to the oval configuration of the valve drive, the latter can have a compact shape, wherein a number of the valves arrangeable next to each other, which can open into one duct, can be increased. Furthermore, an increased switching force can be expected compared to a round piston due to the use of the oval piston or piston portion.

Figure 28:
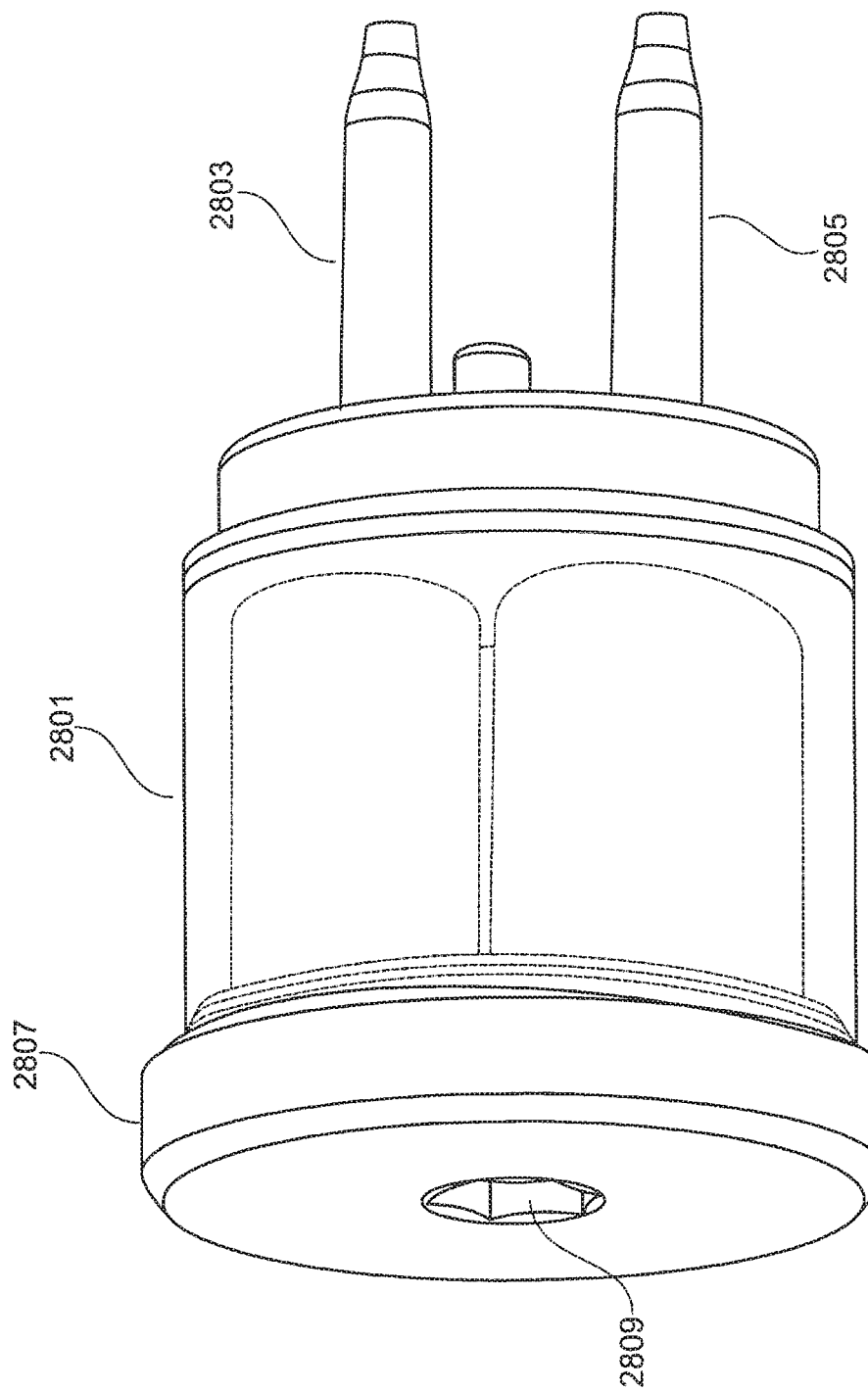
FIG. 28 shows an exemplary coating agent device.

FIG. 28 shows a coating agent device, for example a coating agent valve, with a housing 2801 and a plurality of valve needles 2803 and 2805. The coating agent device may comprise a drive interface 2807, which can have one or a plurality of control inputs 2809 for driving the valve needles 2803. These may be parallel towards the outside and can be operated separately from each other, so that the valve needles 2803 can for example be used for brief flushing with air and the valve needles 2805 can be used for brief flushing with a solvent. Furthermore, the valve needle 2803 can be provided for discharging the coating agent and the valve needle 2805 can be provided for feeding back the same. The drive interface 2807 can for example be oval as in FIG. 26 or circular or angular.

Figure 29:
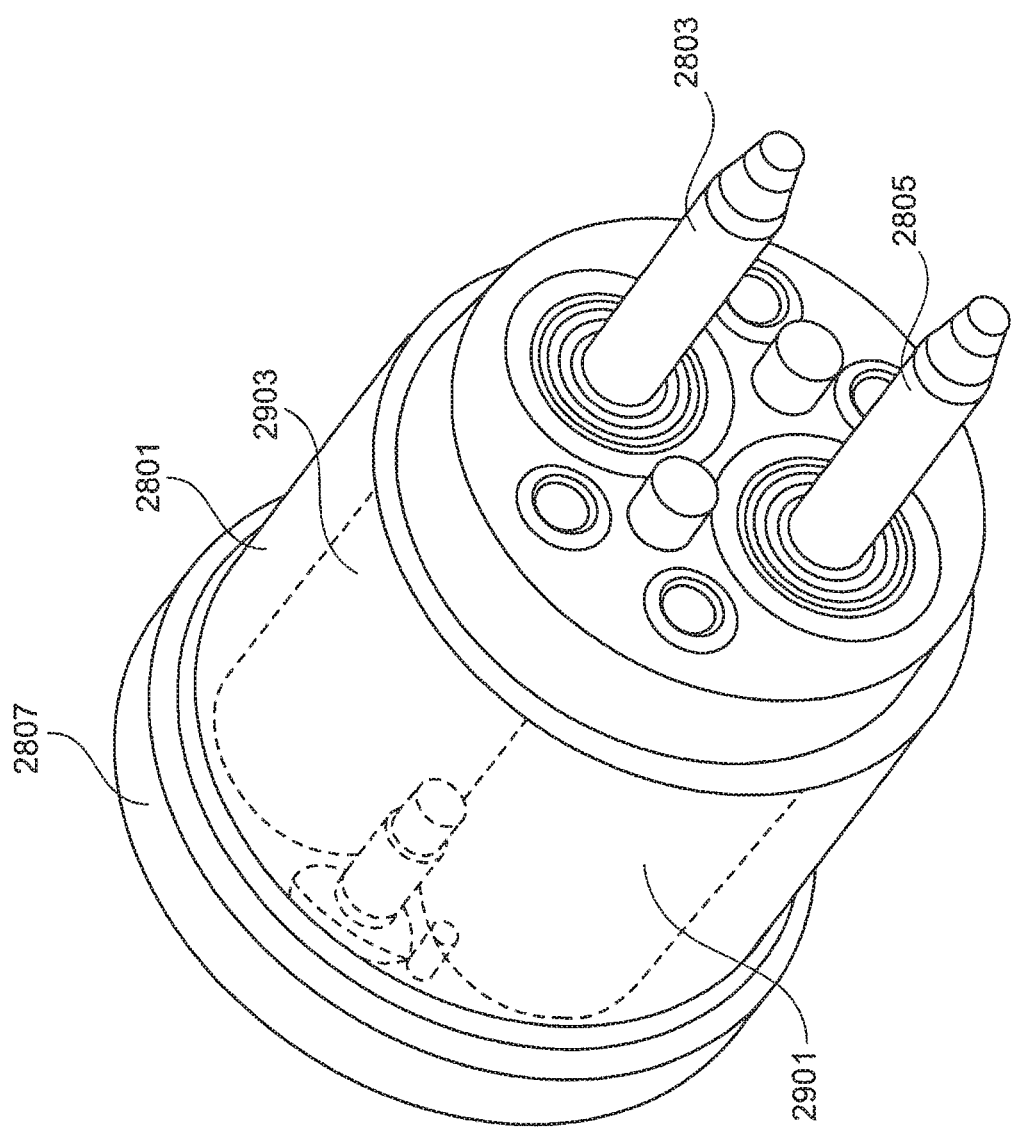
FIG. 29 shows a front view of the exemplary coating agent device of FIG. 28.

FIG. 29 shows a front view of the coating agent device of FIG. 28. As shown in FIG. 29, each valve needle 2803, 2805 is guided in a respective cylinder or duct 2901 or 2903 associated to the respective needle.

Figure 30:
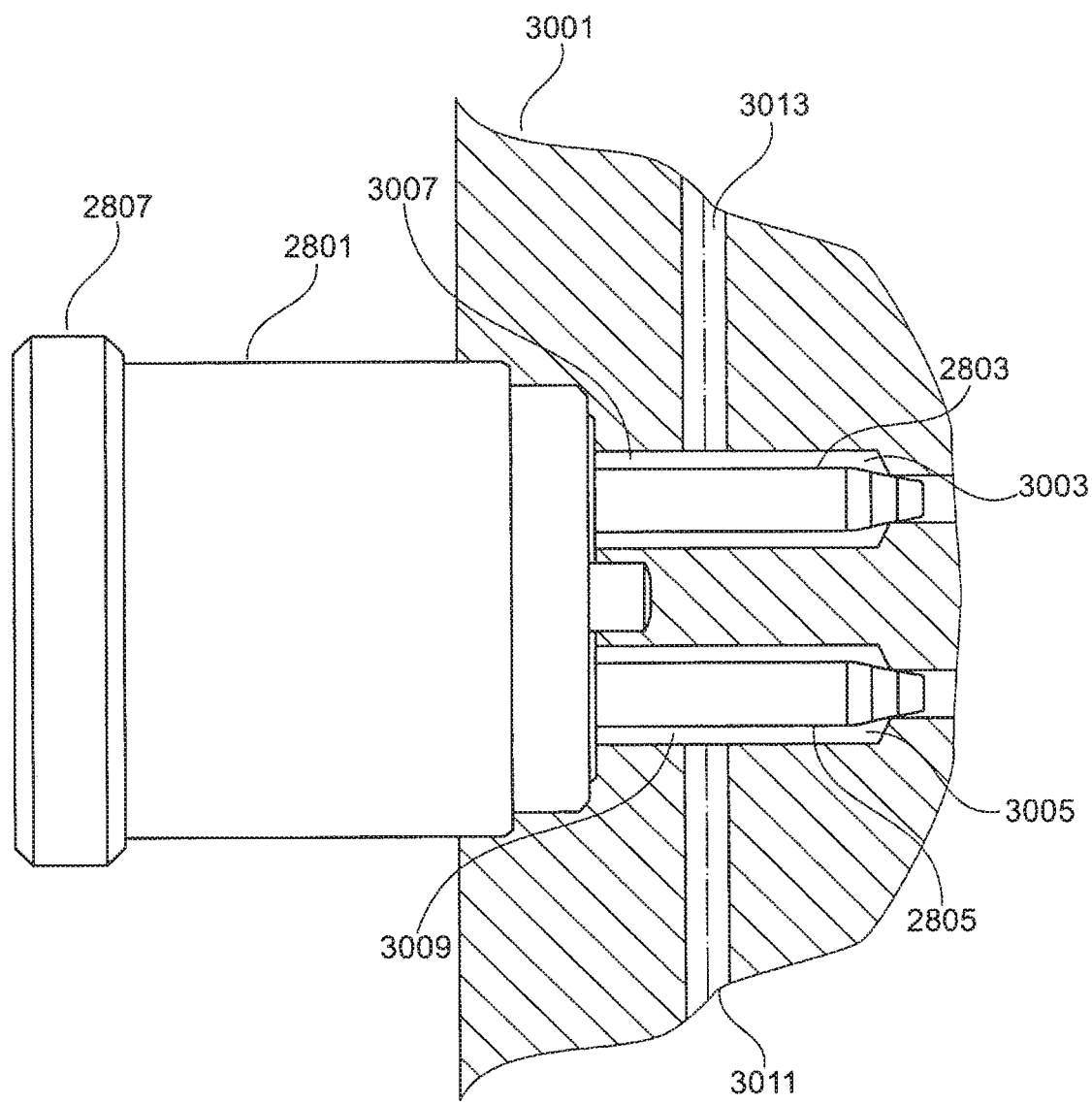
FIG. 30 shows the exemplary coating agent device of FIG. 28.
Figure 32A:
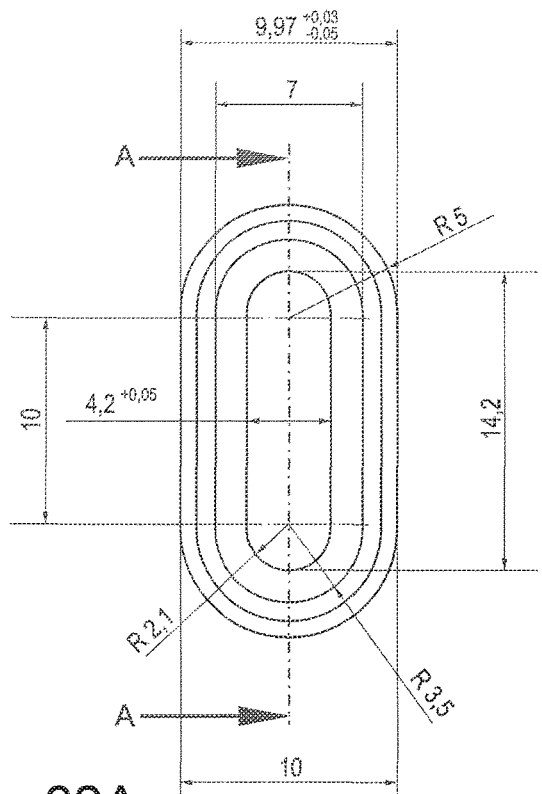
FIGS. 32A to 32D show views of an oval seal, according to an exemplary illustration.
Figure 32B:
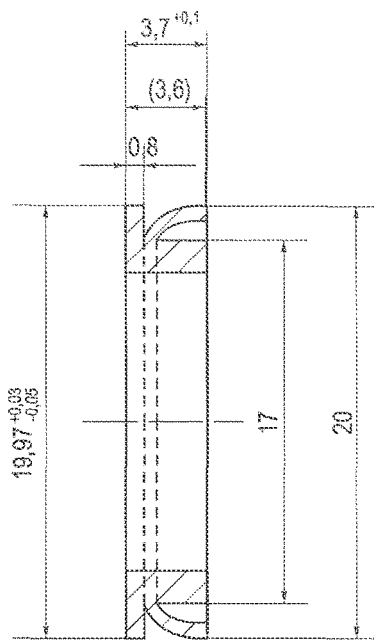
Figure 32C:
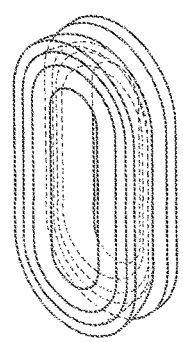
Figure 32D:
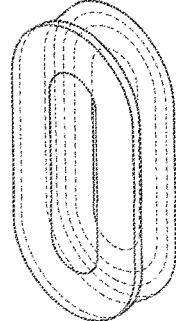

FIG. 30 shows the coating agent device of FIG. 28, which is connected to a coating device 3001, for example an atomizer or a colour changer. The coating device 3001 comprises two valve seats 3003 and 3005, which are each provided for the respective valve needle 2803 and/or 2805. Each needle 2803 or 2805 can be moved in a cylinder or duct 3007 or 3009 associated to it, wherein auxiliary ducts 3011 and 3013 are provided perpendicularly thereto. The auxiliary ducts 3011 and 3013 can for example be provided for flushing the valve needles 2803 and/or 2805 or for feeding back the respective coating agent. The coating agents are guided via the ducts 3007 and 3009, covering the respective needle 2803 and/or 2805.

In the double valve described above, at least two independent functions can be realized, which are possible in a smaller space. Such double valves can for example be realized as functional valves, colour changers or atomizers in all possible combination variants with for example needles of different lengths, as a single valve block with two functions or as a multiple valve block with multiple functions. Such valves can be arranged on one side or opposite or in a circle, for example, wherein the actuation can be realized directly via a hose connection or indirectly via a feed line bore. The valves can further be arranged in series analogously to pneumatic valves.

The housing 2801 and the drive interface 2807 can be circular or oval. Furthermore, the valve needles 2805 and 2803 can be provided with oval piston elements 2501, which are each sealed with seals 2503.

FIGS. 31A to 31D show views of an oval piston element of the above-mentioned type. FIGS. 32A to 32D show views of oval seals, which can for example interact with the oval piston element.

Figure 33:
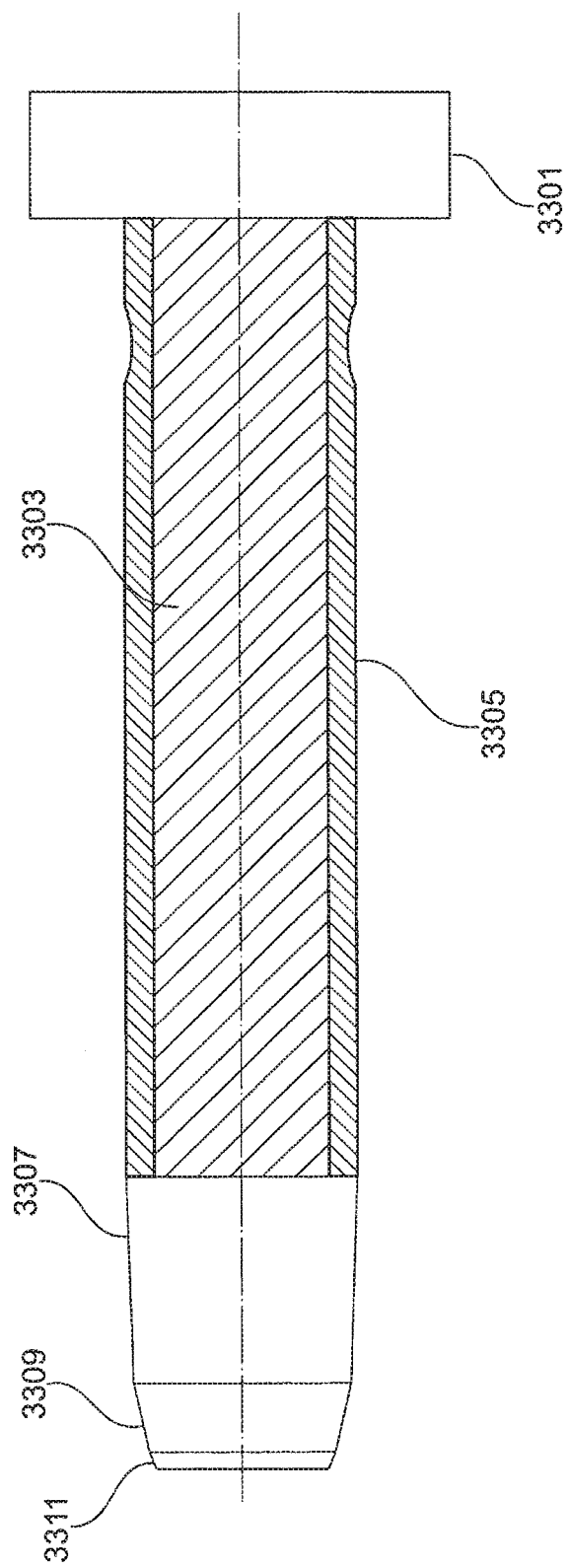
FIG. 33 shows a valve needle, according to an exemplary illustration.

FIG. 33 shows a valve needle with a valve needle head 3301 and a valve needle shaft 3303, which can consist of plastic. The valve needle shaft 3303 may be covered with a sheath 3305, which can be formed from a composite material or from a ceramic material, so that the sheath 3305 is more abrasion-resistant than the valve needle shaft 3303. The sheath 3305 can further be formed from metal or DLC (diamond-like carbon).

An end of the valve needle facing away from the valve needle head 3301 can for example be multiply flattened or include a series of flat surfaces, and for example may have a flushing portion 3307, a sealing portion 3309 and a guide portion 3311. The flushing portion 3307 is used to improve flushing of the valve needle, for example brief flushing of the same. The flushing portion 3307 tapers for example at an inclination angle of 10° or, with respect to a longitudinal axis of the valve needle, at an angle of 5°, merely as examples. A sealing portion 3309, which may interact with a valve seat during operation of the valve needle and provides sealing, may be arranged immediately downstream of the flushing portion 3307. The sealing portion tapers, merely as examples, at an inclination angle of 30% or, with respect to a longitudinal axis of the valve needle, at an angle of 15%. The guide portion 3311, which is used to introduce the valve needle tip into the valve seat, may be arranged downstream of the sealing portion 3309. The guide portion 3311 may be shorter than the other two portions 3307 and 3309 and may taper at an inclination angle of 120° and/or, with respect to the above-mentioned longitudinal axis, at an angle of 60°, as examples. The sheath 3305 and the portions 3307 to 3311 are each optional.

Figures 34A, 34B:
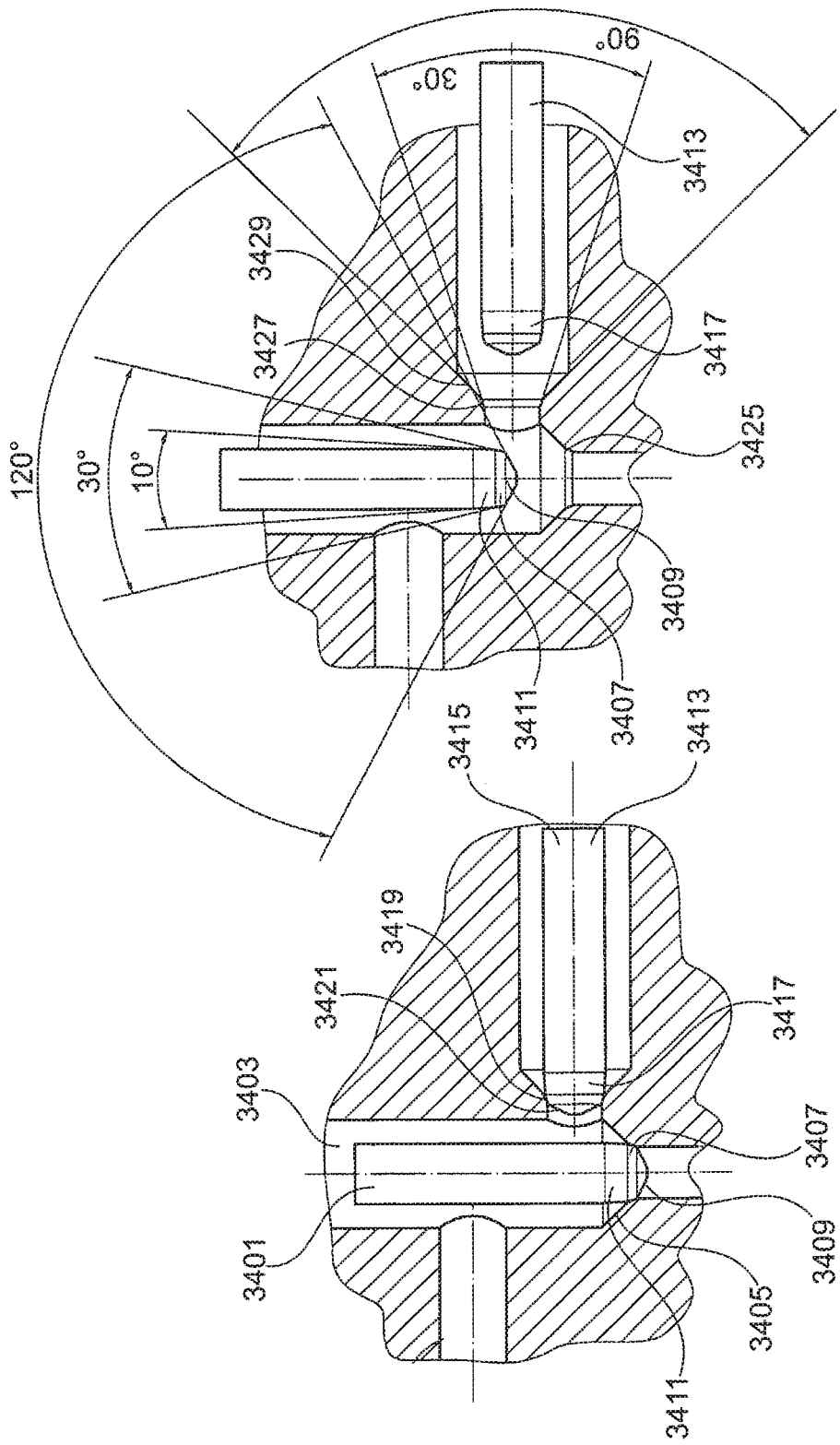
FIGS. 34A and 34B show exemplary valve needles.

FIG. 34A shows a first valve needle 3401 of a coating agent device, which is arranged in a cylinder and/or duct 3403 of a coating device. The cylinder 3403 comprises a valve seat 3405, which is sealed off by means of a sealing portion 3407 of the valve needle 3401. The sealing portion 3407 corresponds for example to the sealing portion 3307. The valve needle 3401 further comprises a guide portion 3409, which can correspond to the guide portion 3311, and a flushing portion 3411, which can correspond to the flushing portion 3307. As shown in FIG. 34A, an intermediate flushing space can be enlarged by the tapering of the flushing portion 3411.

The coating agent device can further have a second needle 3413, which is arranged in a duct 3415 perpendicular to the valve needle 3401. The second valve needle can likewise have a flushing portion 3417, a sealing portion 3419 and a guide portion 3421, wherein the portions 3417, 3419 and 3421 can have the features of the portions 3307, 3309 and 3311. The second valve needle 3413 can for example be operated to flush the first valve needle 3401. The coating agent device further comprises an auxiliary duct 3425, which opens in the coating agent duct 3403.

FIG. 34B illustrates the inclination angles of the guide portion 3409, the sealing portion 3407 and the flushing portion 3411 of the first valve needle 3401 when displaced out of the valve seat. As shown in FIG. 34B, the valve seat comprises a sealing portion 3425 corresponding to the sealing portion 3407.

FIG. 34B further shows the second valve needle 3413 when displaced out of the valve seat. The valve seat can for example have a sealing portion 3427, which is for example inclined at an inclination angle of 90°. This valve seat can also have a further tapered portion 3429, which tapers at an angle of for example 90° and is provided to enlarge an intermediate space between the valve seat and the flushing portion 3417 of the second valve needle 3413.

Figure 35:
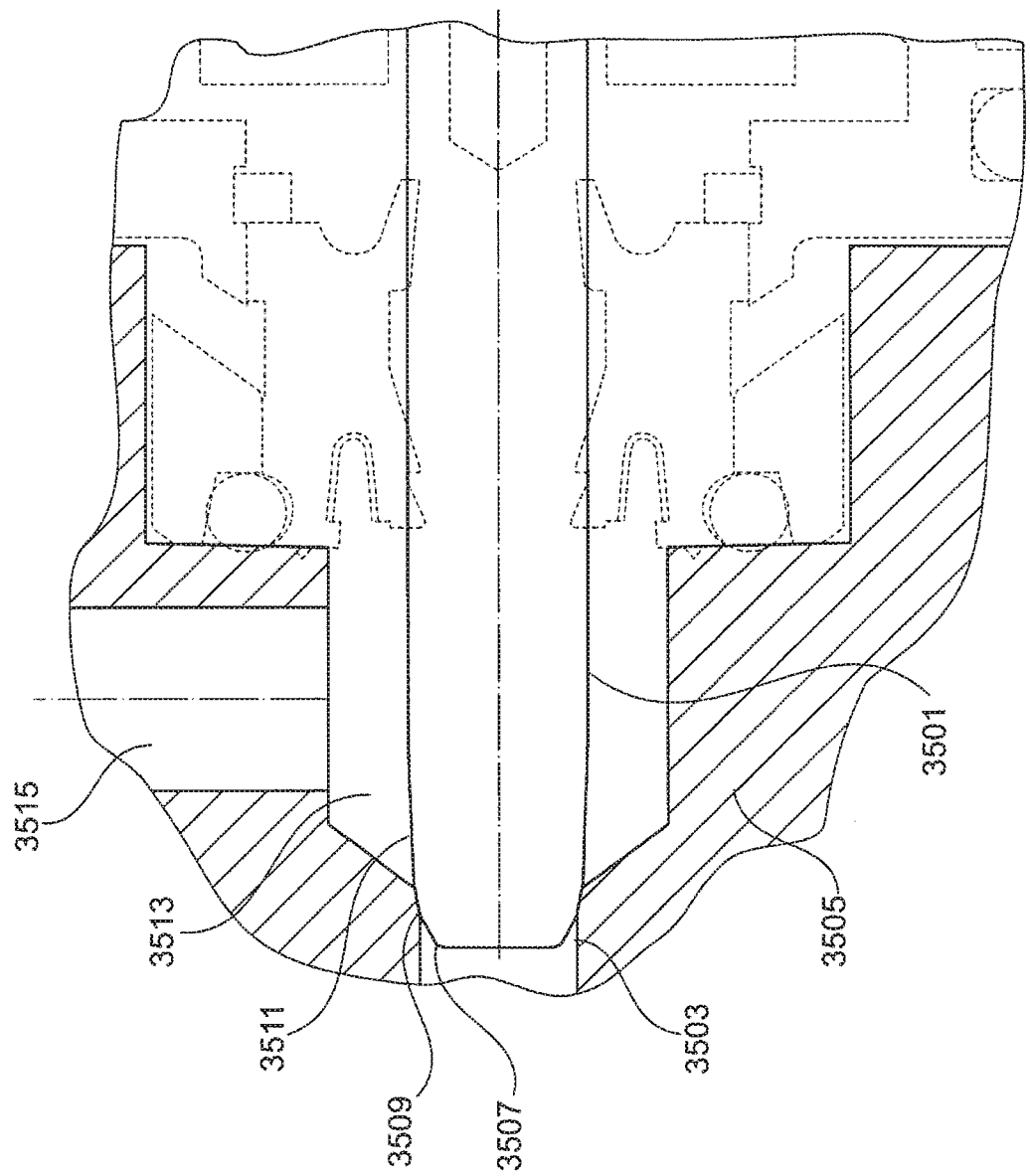
FIG. 35 shows a valve needle, according to an exemplary illustration.

FIG. 35 shows a multiply inclined coating agent valve 3501 which, when in a closed state, sits in a valve seat 3503 of a coating agent device 3505, for example of an atomizer or of a colour changer. The valve needle 3501 comprises a guide portion 3507, a sealing portion 3509 and a flushing portion 3511, which can have the features of the portions shown in FIG. 33. As shown in FIG. 35, in some exemplary illustrations only the sealing portion 3509 interacts in a sealing manner with the valve seat 3503, wherein neither the guide portion 3507 nor the flushing portion 3511 is in contact with it. The valve needle 3501 is arranged in a cylinder and/or duct 3513, wherein a larger intermediate space is provided to flush the needle 3501 due to the provision of the inclined flushing portion 3511. To this end, the coating agent device 3505 can have an auxiliary duct 3515.

Figure 36:
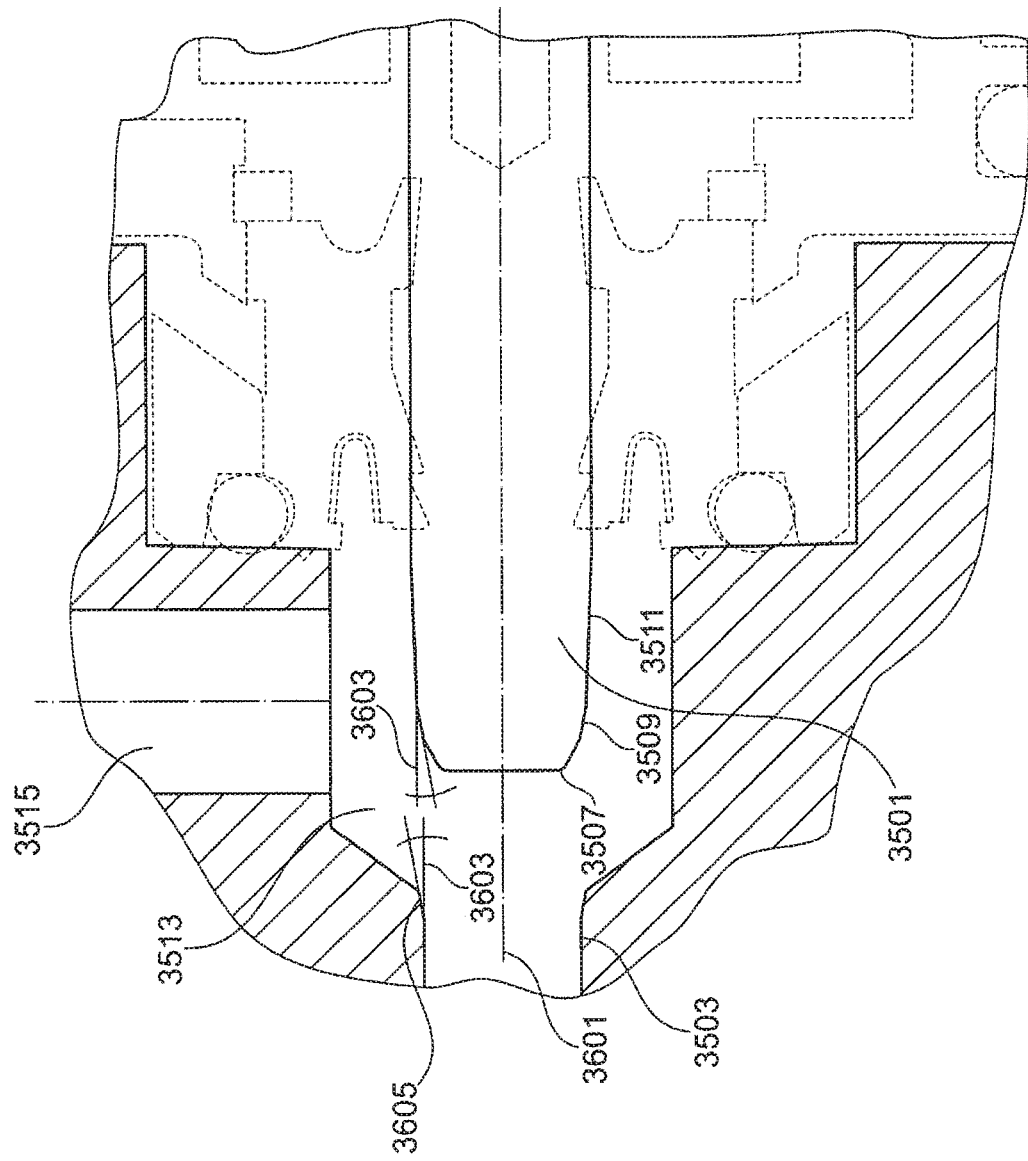
FIG. 36 shows an exemplary valve needle.

FIG. 36 shows the valve needle of FIG. 35 in an open state. The sealing portion 3509 can taper with respect to the longitudinal axis 3601 at a sealing angle 3603, which can be for example 15°. The valve seat 3503 may comprise a sealing portion 3605, which likewise tapers at the same sealing angle 3603.

Figure 37:
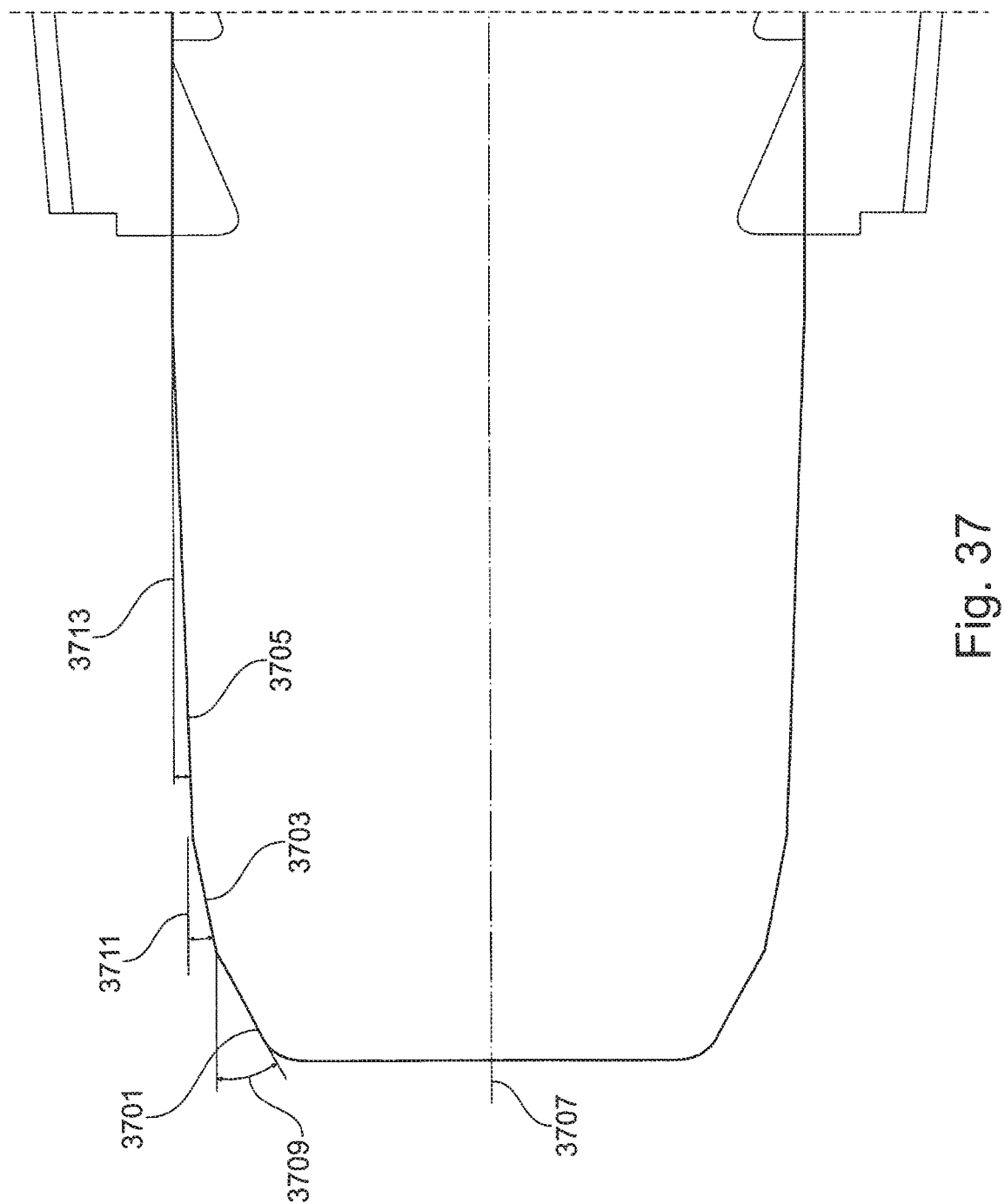
FIG. 37 shows a valve needle, according to an exemplary illustration.

FIG. 37 shows a valve needle tip with a guide portion 3701, a sealing portion 3703 and a flushing portion 3705. The guide portion 3701 may taper with respect to a longitudinal axis 3707 at a guide angle 3709, which can be 60°, for example. The sealing portion 3703 tapers with respect to the longitudinal axis 3707 at a sealing angle 3711, which can be 15°, in one example. The flushing portion 3705 tapers with respect to the longitudinal axis 3707 at a flushing angle 3713, which can be 5°, merely as an example.

The valve needle tip can for example be formed from plastic and can interact with a hard valve seat, which is for example formed from stainless steel. The seal in the valve seat can for example be effected without seating, wherein a secure seal concerning the technical process can be realized in particular in the case of a needle seat in a transition between a soft material and a hard material. The join face may in some exemplary illustrations be considerably enlarged, as a result of which the risk of breakage can be reduced. Finally, a wear-resistant surface of the valve needle can be realized in the region of the seal of the needle towards the valve drive.

The valve seat in the housing of the corresponding coating agent device may be, for example, configured by two angle steps, in contrast to the triple-angled tip of the valve needle. The sealing portions may have the same angle on both sides.

The above-described coating agent devices can be valves which can be used as needle and/or seat valves, as functional valves, colour changer valves, atomizer valves or main needle valves in painting technology. The coating devices can be any devices used in painting technology, for example atomizers or colour changers, which can interact with such coating agent devices.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A coating agent valve device for influencing a discharge of a coating agent, comprising:
   a mounting socket that is pluggable to a housing of a coating device that is at least one of an atomizer and a color changer;
   a receiving sleeve configured to receive the pluggable mounting socket, the pluggable mounting socket rotating securable to the receiving sleeve; and
   a wall of the pluggable mounting socket has a thread for rotation securement, and wall portions of the wall which are thread-free or provided with flatter thread flights or thread flanks compared to other wall portions of the wall extend in an axial direction of the pluggable mounting socket, arranged in a rotationally symmetrical manner or in a rotationally asymmetrical manner.

2. The coating agent valve device of claim 1, wherein the thread comprises a pitch between 1 and 3.

3. The coating agent valve device of claim 1, wherein the thread comprises rounded thread flanks and rounded thread flights under a rounding inclination angle of +/−10°.

4. The coating agent valve device of claim 1, wherein the thread comprises rounded thread crests and rounded thread roots.

5. The coating agent valve device of claim 1, wherein the thread comprises a diameter between 10-14 mm.

6. The coating agent valve device of claim 1, wherein the receiving sleeve comprises lateral threaded segments configured to receive the threaded portions of the wall of the pluggable mounting socket.

7. The coating agent valve device of claim 6, wherein the receiving sleeve comprises threaded recesses configured to receive the thread of the pluggable mounting socket.

* * * * *